US012669242B2

(12) United States Patent
Michalak et al.

(10) Patent No.: US 12,669,242 B2
(45) Date of Patent: Jun. 30, 2026

(54) GRILL COOKBOXES INCLUDING DUAL-LIPPED LOWER RIMS

(71) Applicant: Weber-Stephen Products LLC, Palatine, IL (US)

(72) Inventors: Matthew C. Michalak, Chicago, IL (US); Evan A. Hall, Palatine, IL (US)

( * ) Notice: Subject to any disclaimer, the term of this patent is extended or adjusted under 35 U.S.C. 154(b) by 366 days.

(21) Appl. No.: 18/527,609

(22) Filed: Dec. 4, 2023

(65) Prior Publication Data

US 2025/0180203 A1     Jun. 5, 2025

(51) Int. Cl.

| | |
|---|---|
| *A47J 37/07* | (2006.01) |
| *F23B 30/00* | (2006.01) |
| *F24B 13/00* | (2006.01) |
| *F24B 13/04* | (2006.01) |

(52) U.S. Cl.
CPC ............. *F23B 1/30* (2013.01); *A47J 37/0704* (2013.01); *A47J 37/0786* (2013.01); *F24B 13/008* (2013.01); *F24B 13/04* (2013.01)

(58) Field of Classification Search
CPC ...... F23B 1/30; A47J 37/0704; A47J 37/0786; F24B 13/008; F24B 13/04
USPC ....................................................... 126/25 R
See application file for complete search history.

(56) References Cited

U.S. PATENT DOCUMENTS

| | | | |
|---|---|---|---|
| 6,959,704 | B2 | 11/2005 | Han et al. |
| 7,263,990 | B1 | 9/2007 | Lenhart |
| 7,677,160 | B2 | 3/2010 | Tippmann, Sr. et al. |
| 7,743,697 | B2 | 6/2010 | Cutrer, Jr. |
| 8,631,738 | B2 | 1/2014 | Tippmann et al. |
| 11,067,289 | B2 | 7/2021 | Kitayama et al. |
| 2006/0180137 | A1 | 8/2006 | McDonald |
| 2013/0004633 | A1 | 1/2013 | McMaster et al. |
| 2017/0059171 | A1 | 3/2017 | Kitayama et al. |
| 2018/0263415 | A1 * | 9/2018 | Hackley .............. A47J 37/0786 |
| 2020/0008618 | A1 * | 1/2020 | Seong ..................... F24B 7/005 |
| 2020/0281402 | A1 | 9/2020 | Witzel et al. |
| 2020/0323322 | A1 | 10/2020 | Washington |
| 2022/0214044 | A1 | 7/2022 | Zheng |
| 2022/0240720 | A1 | 8/2022 | Afonso |

FOREIGN PATENT DOCUMENTS

| | | |
|---|---|---|
| EP | 0590788 A1 | 4/1994 |
| WO | 2021138455 A1 | 7/2021 |
| WO | 2022119641 A1 | 6/2022 |

OTHER PUBLICATIONS

International Searching Authority, "International Search Report and Written Opinion," issued in connection with International Patent Application No. PCT/US2024/054337, mailed on Feb. 20, 2025, 10 pages.

* cited by examiner

*Primary Examiner* — Avinash A Savani
(74) *Attorney, Agent, or Firm* — Avantech Law, LLP

(57) ABSTRACT

Grill cookboxes including dual-lipped lower rims are disclosed. An example cookbox includes an interior surface, an exterior surface, and a lower rim. The exterior surface is located opposite the interior surface. The lower rim is located along a bottom portion of the cookbox. The lower rim includes an inner lip, an outer lip, and a downwardly facing channel. The inner lip defines an opening formed in the bottom portion of the cookbox. The downwardly facing channel extends between a free end of the inner lip and a free end of the outer lip.

20 Claims, 21 Drawing Sheets

SECTION D-D

SECTION A-A

SECTION A-A

SECTION B-B

SECTION B-B

SECTION C-C

SECTION C-C

SECTION D-D

SECTION D-D

GRILL COOKBOXES INCLUDING DUAL-LIPPED LOWER RIMS

FIELD OF THE DISCLOSURE

This disclosure relates generally to cookboxes for grills and, more specifically, to grill cookboxes including dual-lipped lower rims.

BACKGROUND

Grills (e.g., gas grills, charcoal grills, pellet grills, electric grills, etc.) are commonly equipped with a cookbox configured to warm, heat, and/or cook one or more food item(s). In some known implementations, the grill further includes a waste collection assembly including a waste tray located beneath a lower opening formed in a bottom portion of the cookbox, wherein the waste tray and/or, more generally, the waste collection assembly is configured to receive, collect, and/or store cooking waste (e.g., grease, ash, and/or other residual cooking matter) that passes through the lower opening of the cookbox.

In some known implementations, the waste tray can be manually removed from its location beneath the cookbox by lifting the waste tray off of a pair of support rails that otherwise rigidly hold the waste tray in place. A user of the grill may remove the waste tray from the support rails to better facilitate the manual removal of accumulated waste off of or out of the waste tray. In other known implementations, the waste tray is slidable relative to the cookbox between a closed position in which the waste tray is located directly beneath the lower opening of the cookbox, and an open position in which a majority of the waste tray is located forward of the lower opening of the cookbox, wherein the waste tray remains suspended via a pair of guide rails regardless of whether the waste tray is in the closed position or the open position. A user of the grill may slide the waste tray along the guide rails from the closed position to the open position to better facilitate the manual removal of accumulated waste off of or out of the waste tray.

Figure 1:
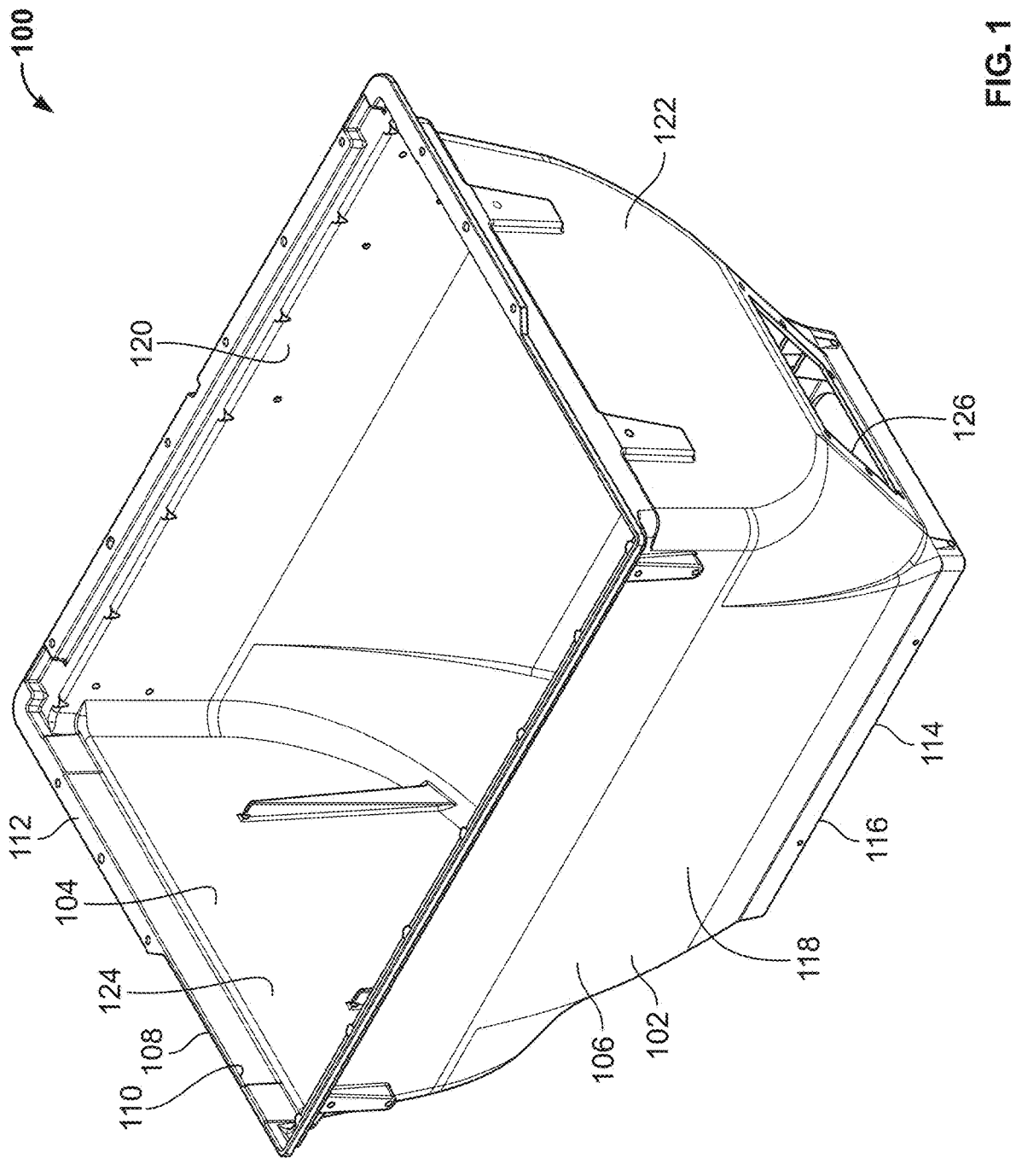
FIG. 1 is a perspective view of an example cookbox constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, it is common for grills to be equipped not only with a cookbox, but with a waste collection assembly as well. In some known grills, the waste collection assembly includes a waste tray located beneath a lower opening formed in a bottom portion of the cookbox, wherein the waste tray and/or, more generally, the waste collection assembly is configured to receive, collect, and/or store cooking waste (e.g., grease, ash, and/or other residual cooking matter) that passes through the lower opening of the cookbox. In some known grills that include such waste collection systems, the lower opening formed in the bottom portion of the cookbox is defined by an associated lower rim of the cookbox, with the lower rim being defined in part by an associated downwardly extending lip. In such known grills, the lower opening, the lower rim, and the downwardly extending lip of the cookbox are collectively configured to be located within and/or circumscribed by a perimeter defined by an upper rim of the waste tray of the waste collection assembly, thereby causing internal moisture (e.g., grease) located on an interior surface of the cookbox to be directed into the waste tray of the waste collection assembly. One disadvantage of such an arrangement is that external moisture (e.g., rainwater) located on an exterior surface of the cookbox can often also make its way into the waste tray of the waste collection assembly.

Unlike the known grills described above, example grills disclosed herein include cookboxes having dual-lipped lower rims that advantageously reduce, limit, and/or prevent external moisture (e.g., rainwater) located on the exterior surface of the cookbox from making its way into the waste tray of the waste collection assembly. In some disclosed examples, a cookbox of a grill includes an interior surface, an exterior surface, and a lower rim. The exterior surface is located opposite the interior surface, and the lower rim is located along a bottom portion of the cookbox. In some disclosed examples, the lower rim is advantageously structured as a dual-lipped rim including an inner lip, an outer lip, and a downwardly facing channel. The inner lip of the lower rim defines a lower opening formed in the bottom portion of the cookbox.

The downwardly facing channel of the lower rim extends between a free end of the inner lip of the lower rim and a free end of the outer lip of the lower rim. The downwardly facing channel forms and/or defines a gap that separates and/or spaces the free end of the outer lip of the lower rim apart from the free end of the inner lip of the lower rim.

In some disclosed examples, the inner lip of the lower rim is configured to direct internal moisture received at the inner lip from the interior surface of the cookbox toward, into, and/or through the lower opening of the cookbox. For example, grease is commonly deposited on the interior surface of the cookbox during a cooking process. As the grease flows downward (e.g., due to gravity) along the interior surface of the cookbox, the grease is received at the inner lip of the lower rim. The inner lip of the lower rim directs the received grease toward, into, and/or through the lower opening of the cookbox. In some disclosed examples, the outer lip of the lower rim is configured to direct external moisture received at the outer lip from the exterior surface of the cookbox away from and/or past (but not into or through) the lower opening of the cookbox. For example, rainwater is commonly deposited on the exterior surface of the cookbox during a rainstorm. As the rainwater flows downward (e.g., due to gravity) along the exterior surface of the cookbox, the rainwater is received at the outer lip of the lower rim. The outer lip of the lower rim directs the received rainwater away from and/or past (but not into or through) the lower opening of the cookbox.

In some disclosed examples, the grill further includes a waste collection assembly having a waste tray configured to receive cooking waste from the cookbox via the lower opening. The waste tray is movable (e.g., slidable) relative to the cookbox between a closed position and an open position. In some disclosed examples, the free end of the inner lip of the lower rim defines and/or constitutes an internal drip point for internal moisture (e.g., grease) received at the inner lip of the lower rim from the interior surface of the cookbox, and the free end of the outer lip of the lower rim defines and/or constitutes an external drip point for external moisture (e.g., rainwater) received at the outer lip of the lower rim from the exterior surface of the cookbox.

When the waste tray is in the closed position relative to the cookbox, the internal drip point defined by the free end of the inner lip of the lower rim is located within a perimeter defined by an upper opening of the waste tray, and the external drip point defined by the free end of the outer lip of the lower rim is located outside of the perimeter defined by the upper opening of the waste tray. The internal drip point defined by the free end of the inner lip of the lower rim directs internal moisture (e.g., grease) received at the inner lip from the interior surface of the cookbox toward and/or into the waste tray, while the external drip point defined by the free end of the outer lip of the lower rim directs external moisture (e.g., rainwater) received at the outer lip from the exterior surface of the cookbox away from and/or past (but not toward or into) the waste tray. The aforementioned arrangement advantageously reduces, limits, and/or prevents external moisture (e.g., rainwater) traveling along the exterior surface of the cookbox from entering the waste tray, while still enabling internal moisture (e.g., grease) traveling along the interior surface of the cookbox to enter the waste tray.

The above-identified features as well as other advantageous features of example grill cookboxes including dual-lipped lower rims as disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein, in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms.

Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
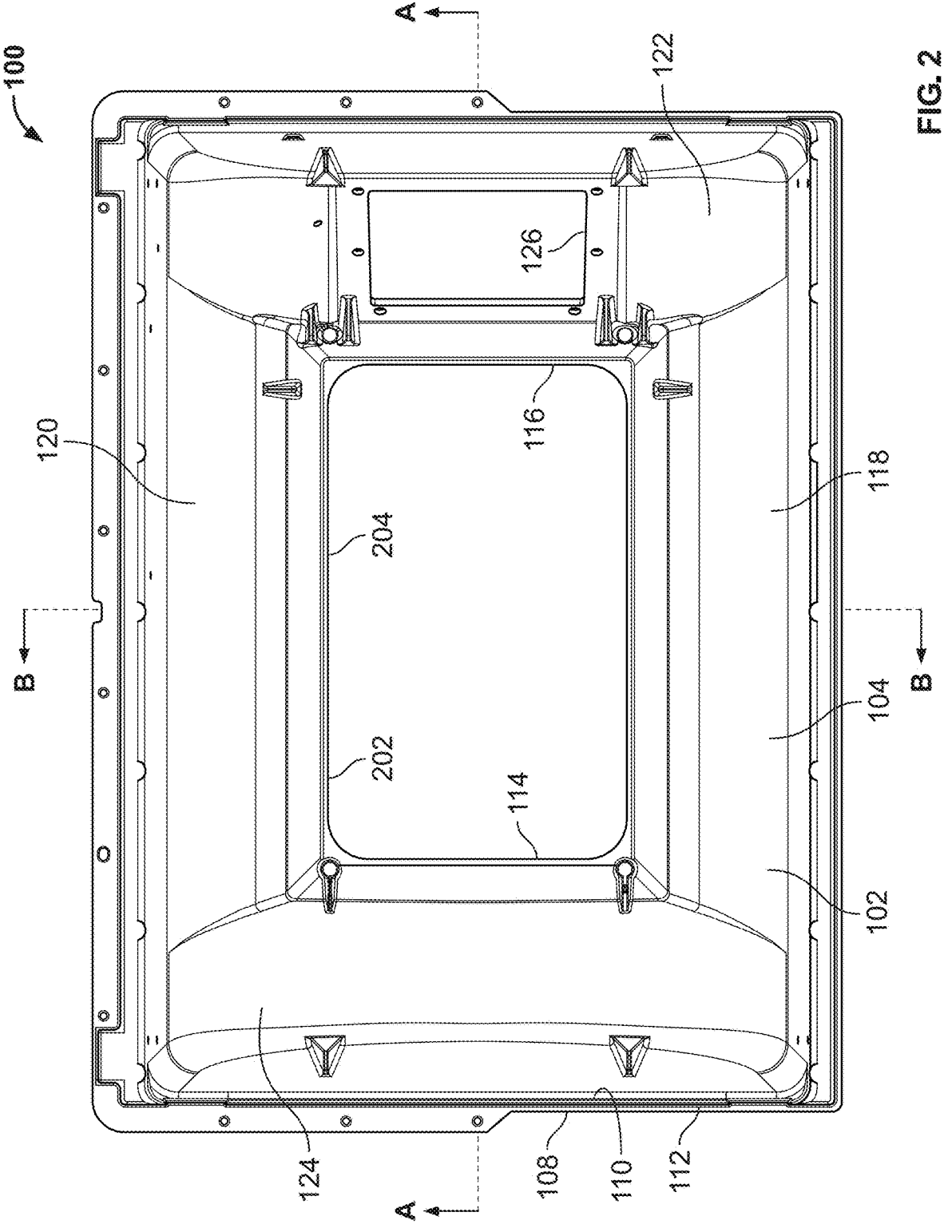
FIG. 2 is a top view of the cookbox of FIG. 1.
Figure 3:
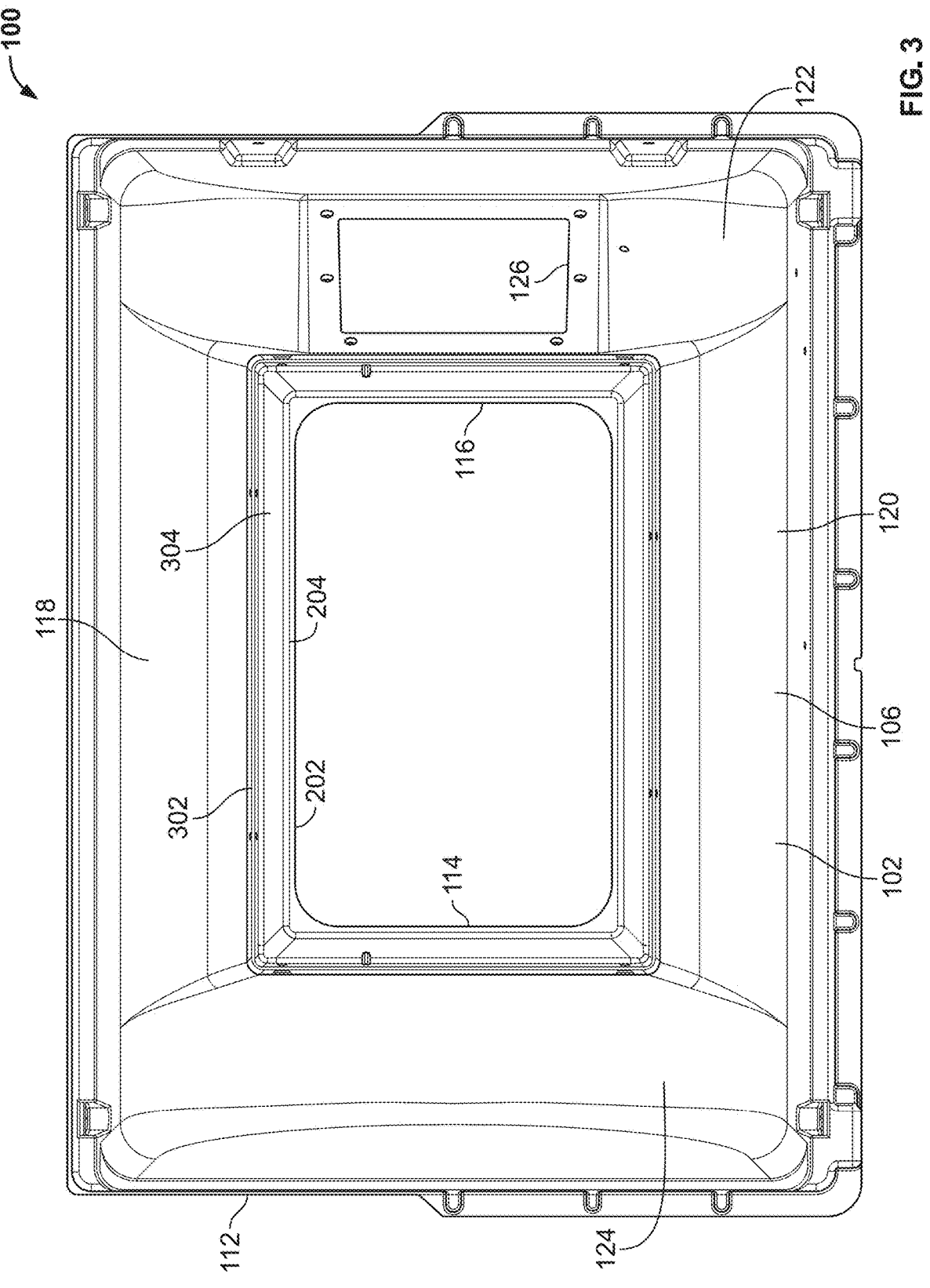
FIG. 3 is a bottom view of the cookbox of FIGS. 1 and 2.
Figure 4:
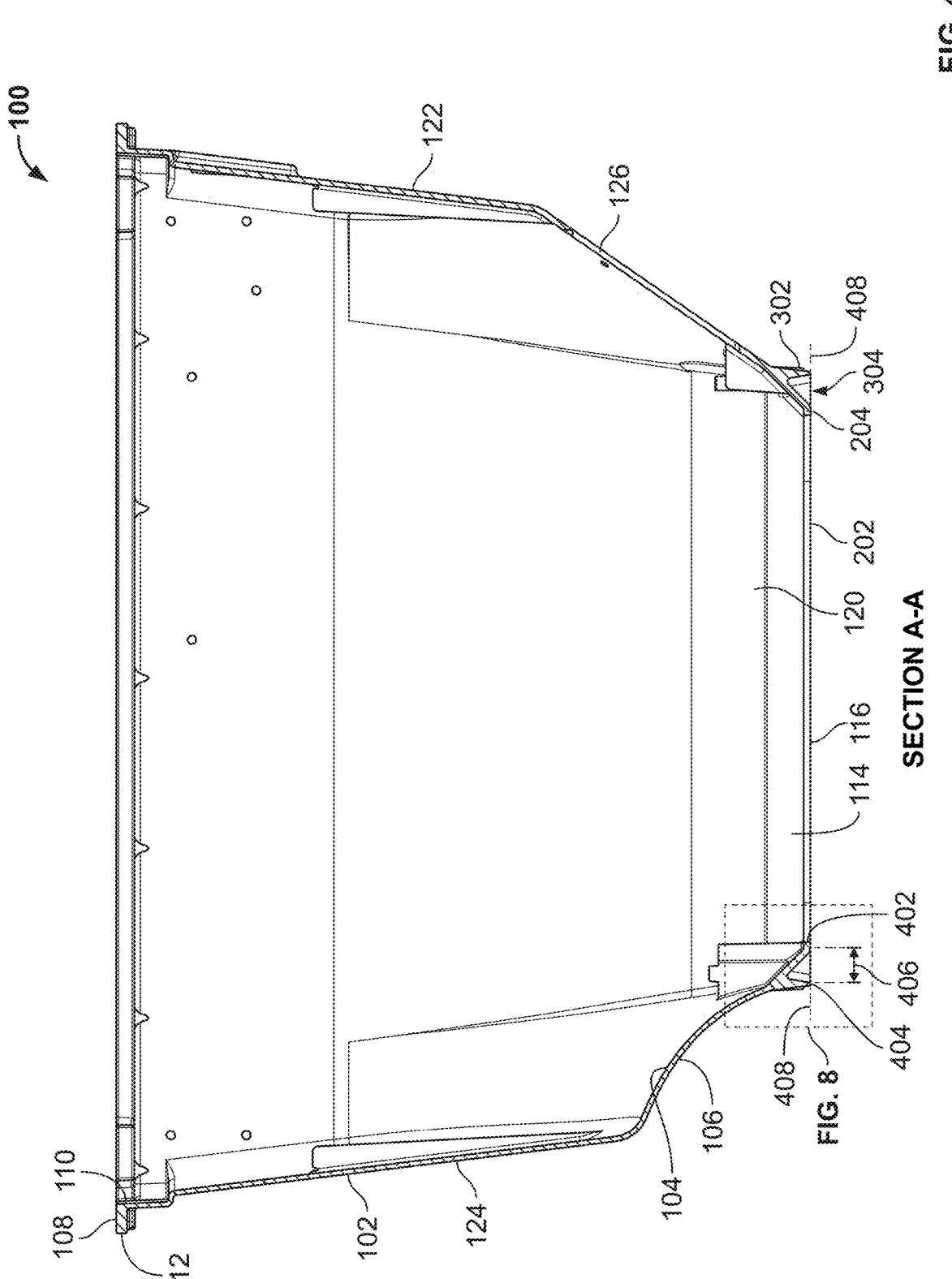
FIG. 4 is a cross-sectional view of the cookbox of FIGS. 1-3 taken along section A-A of FIG. 2.
Figure 5:
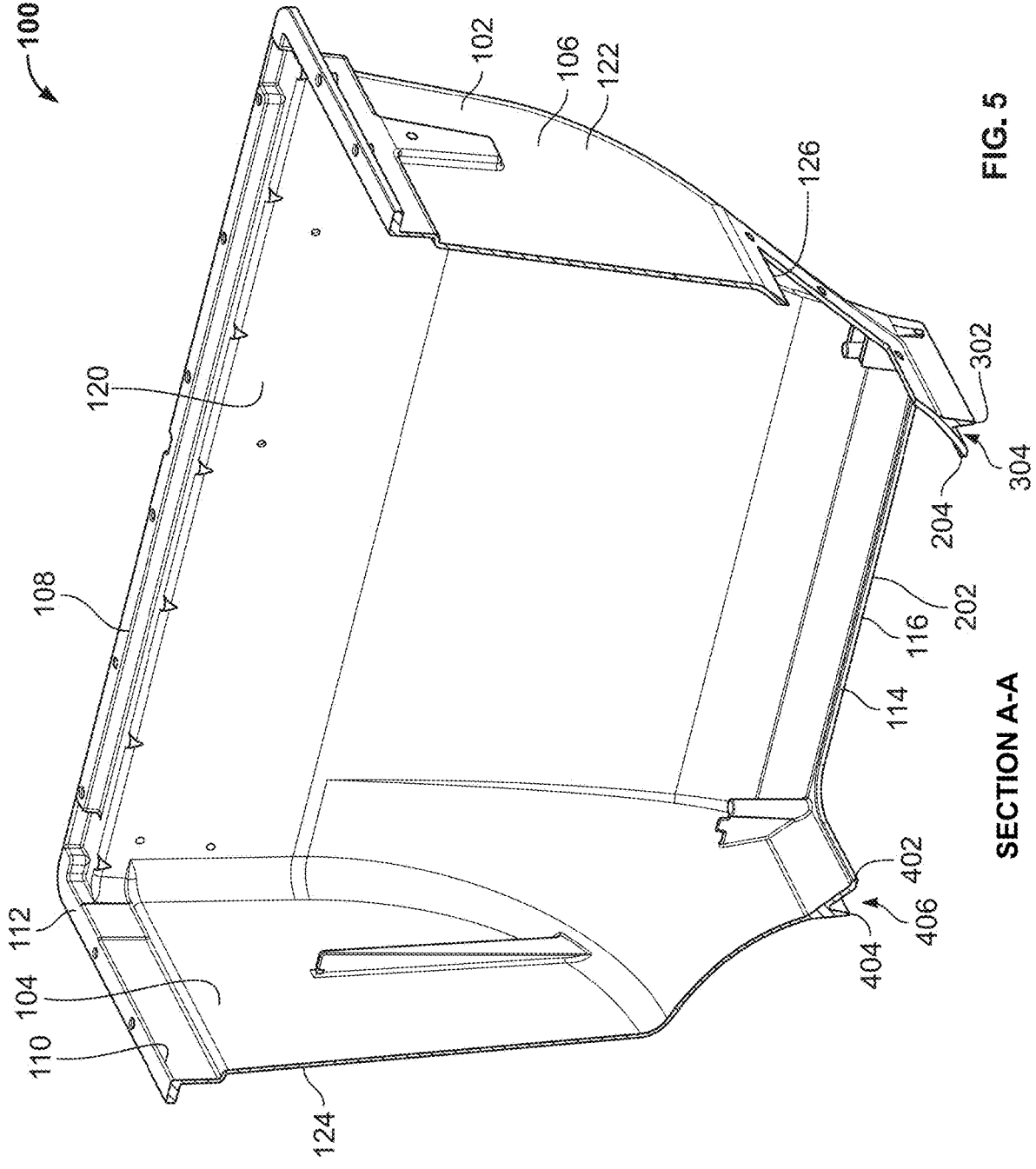
FIG. 5 is a perspective view of the cross-sectional view of FIG. 4.
Figure 6:
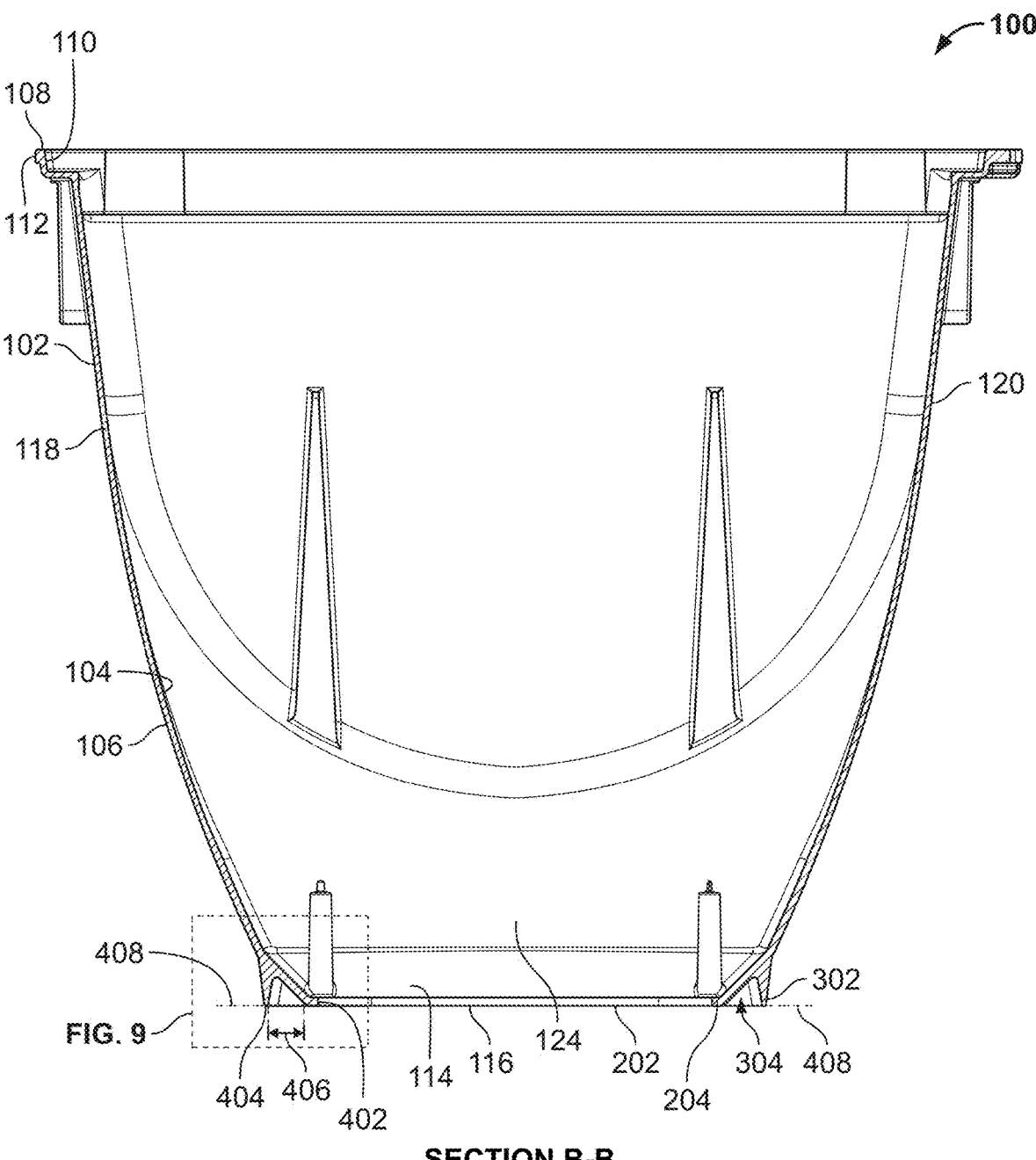
FIG. 6 is a cross-sectional view of the cookbox of FIGS. 1-5 taken along section B-B of FIG. 2.
Figure 7:
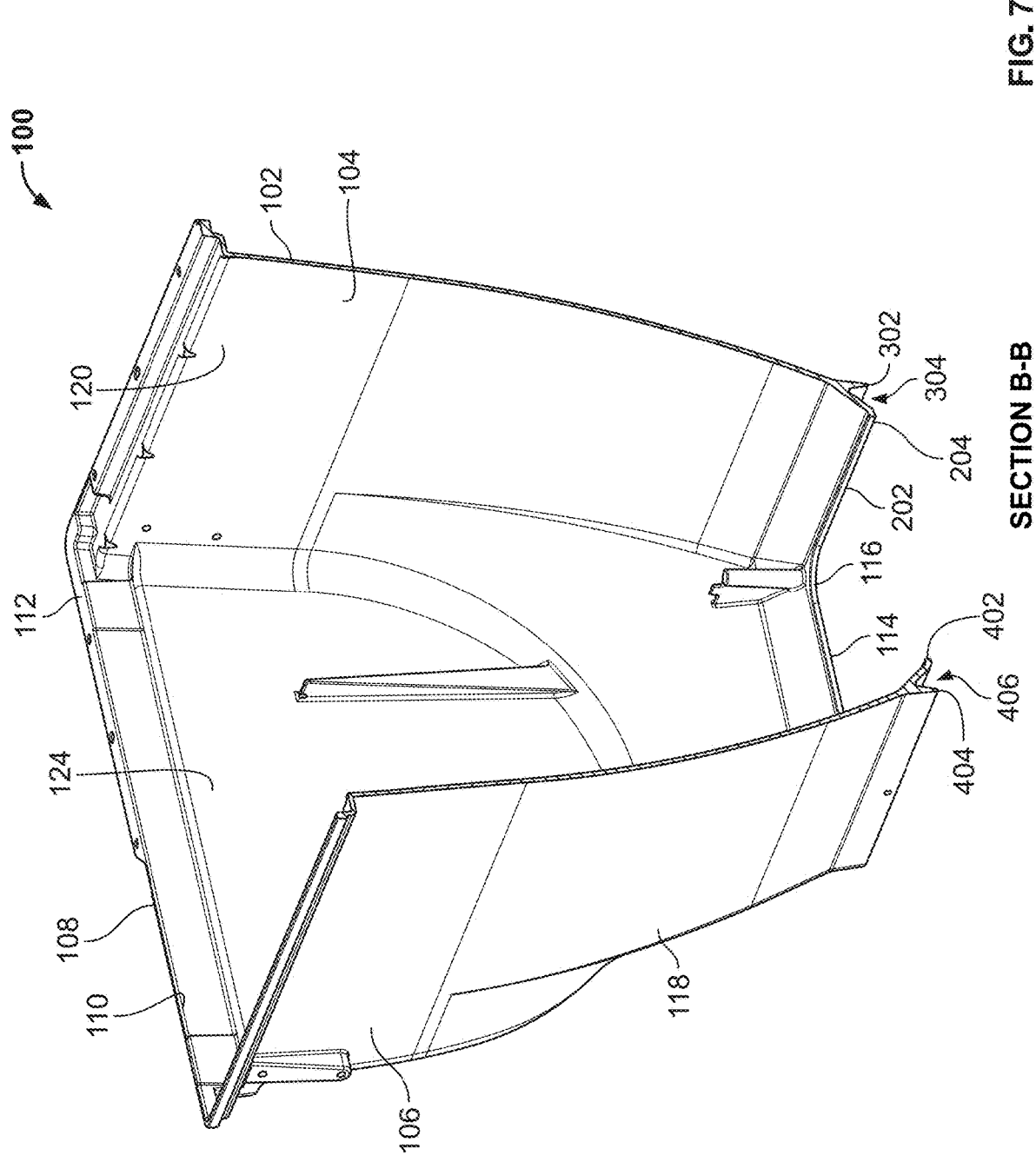
FIG. 7 is a perspective view of the cross-sectional view of FIG. 6.
Figure 8:
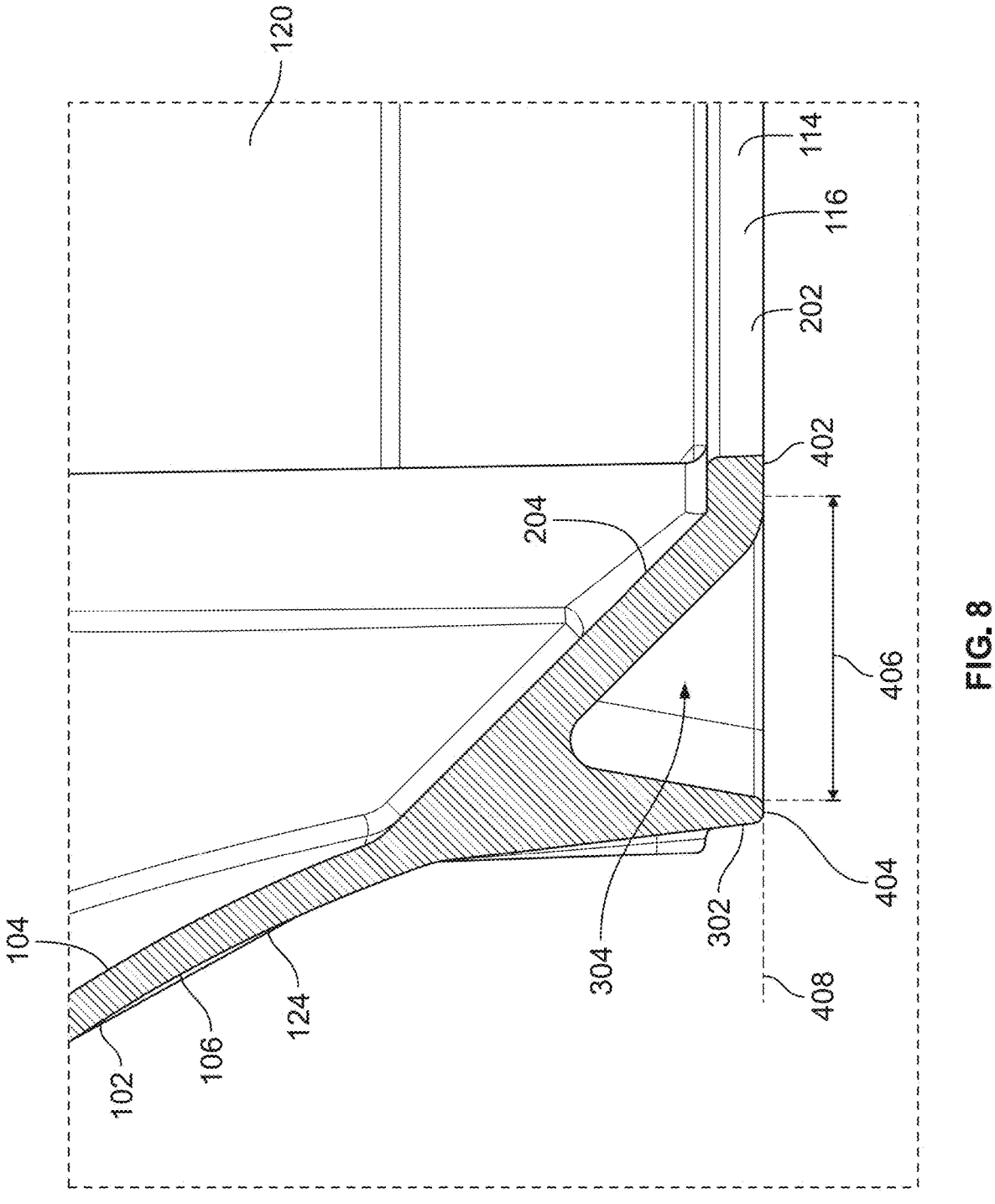
FIG. 8 is an enlarged view of a portion of FIG. 4.
Figure 9:
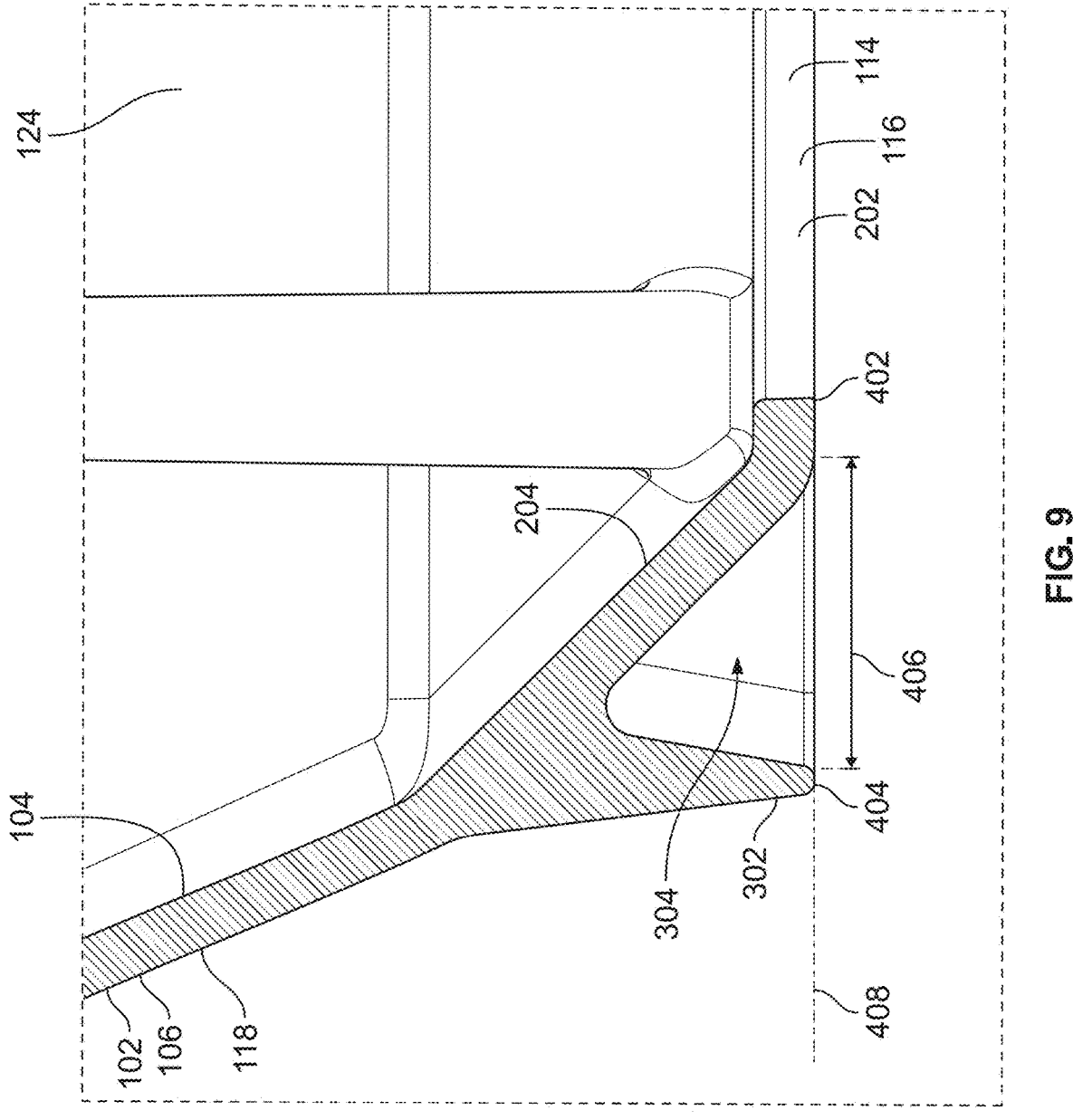
FIG. 9 is an enlarged view of a portion of FIG. 6.

FIG. 1 is a perspective view of an example cookbox 100 constructed in accordance with the teachings of this disclosure. FIG. 2 is a top view of the cookbox 100 of FIG. 1. FIG. 3 is a bottom view of the cookbox 100 of FIGS. 1 and 2. FIG. 4 is a cross-sectional view of the cookbox 100 of FIGS. 1-3 taken along section A-A of FIG. 2. FIG. 5 is a perspective view of the cross-sectional view of FIG. 4. FIG. 6 is a cross-sectional view of the cookbox 100 of FIGS. 1-5 taken along section B-B of FIG. 2. FIG. 7 is a perspective view of the cross-sectional view of FIG. 6. FIG. 8 is an enlarged view of a portion of FIG. 4. FIG. 9 is an enlarged view of a portion of FIG. 6.

The cookbox 100 of FIGS. 1-9 includes an example sidewall 102 having an example interior surface 104 and an example exterior surface 106 located opposite the interior surface 104. An upper portion of the sidewall 102 defines and/or terminates in an example upper rim 108. The upper rim 108 of the cookbox 100 defines an example upper opening 110 formed in and/or located along an example top portion 112 of the cookbox 100. Conversely, a lower portion of the sidewall 102 defines and/or terminates in an example lower rim 114. The lower rim 114 of the cookbox 100 defines an example lower opening 202 formed in and/or located along an example bottom portion 116 of the cookbox 100. As shown in FIGS. 1-9, the sidewall 102 also generally defines an example front portion 118, an example rear portion 120, an example right side portion 122, and an example left side portion 124 of the cookbox 100, each of which extends downwardly from the upper rim 108 of the cookbox 100 to or toward the lower rim 114 of the cookbox 100.

In the illustrated example of FIGS. 1-9, the cookbox 100 is a box-shaped structure, with the upper rim 108 and the lower rim 114 of the cookbox 100 respectively having a generally rectangular shape. In other examples, the cookbox 100 can have a different shape. For example, the cookbox 100 can be a bowl-shaped structure (e.g., a kettle), with the upper rim 108 and the lower rim 114 of the cookbox 100 respectively having a generally circular shape. In other examples, the respective shapes of the upper rim 108 and the lower rim 114 of the cookbox 100 can differ from one another. For example, the upper rim 108 of the cookbox 100 can have a generally rectangular shape and the lower rim 114 of the cookbox 100 can have a generally circular shape. As another example, the upper rim 108 of the cookbox 100 can have a generally circular shape and the lower rim 114 of the cookbox 100 can have a generally rectangular shape.

In the illustrated example of FIGS. 1-9, the sidewall 102 of the cookbox 100 tapers inwardly as the sidewall 102 extends from the upper rim 108 of the cookbox 100 to or toward the lower rim 114 of the cookbox 100. In other examples, the sidewall 102 of the cookbox 100 can lack such an inward taper. For example, the sidewall 102 of the cookbox 100 can be perfectly vertical as it extends from the upper rim 108 of the cookbox 100 to or toward the lower rim 114 of the cookbox 100. As another example, the sidewall 102 of the cookbox 100 can taper outwardly as it extends from the upper rim 108 of the cookbox 100 to or toward the lower rim 114 of the cookbox 100.

The cookbox 100 of FIGS. 1-9 is configured to house, carry, and/or otherwise include one or more heat-generating structure(s). For example, in instances where the cookbox 100 is implemented as a component of a pellet grill, the cookbox 100 can house, carry, and/or otherwise include a burn pot along with portions of an auger, an auger tube, and/or a ducted housing, wherein the burn pot is configured to generate and/or emit heat derived from the combustion of wood pellets located therein. As another example, in instances where the cookbox 100 is implemented as a component of a gas grill, the cookbox 100 can house, carry, and/or otherwise include one or more burner tube(s) configured to generate and/or emit a heat-producing gas flame. As another example, in instances where the cookbox 100 is implemented as a component of an electric grill, the cookbox 100 can house, carry, and/or otherwise include one or more electric heating element(s) configured to generate and/or emit heat in response to electrical power supplied thereto. As another example, in instances where the cookbox 100 is implemented as a component of a charcoal grill, the cookbox 100 can house, carry, and/or otherwise include a fuel grate configured to support charcoal while the charcoal undergoes a heat-generating combustion process.

In some examples, the sidewall 102 of the cookbox 100 includes one or more opening(s) formed in the front portion 118, the rear portion 120, the right side portion 122, and/or the left side portion 124 of the of the cookbox 100 and configured to receive one or more portion(s) of the aforementioned heat-generating structure(s). For example, as shown in FIGS. 1-9, the sidewall 102 includes an example side opening 126 formed in the right side portion 122 of the cookbox 100, with the side opening 126 being configured to receive one or more portion(s) of an auger, an auger tube, and/or a ducted housing that extend(s) through the right side portion 122 of the cookbox 100 to or toward a burn pot located within the cookbox 100. In some examples, the cookbox 100 of FIGS. 1-9 is further configured to house, carry, and/or support one or more cooking grate(s) located and/or positioned within the cookbox 100 above the heat-generating structure(s) of the cookbox 100. In some examples, the cookbox 100 of FIGS. 1-9 is further configured to house, carry, and/or support one or more grease deflector(s) and/or one or more heat diffuser(s) located and/or positioned within the cookbox 100 below the cooking grate(s) and above the heat-generating structure(s) of the cookbox 100.

The lower rim 114 of the cookbox 100 of FIGS. 1-9 is advantageously structured as a dual-lipped rim including an example inner lip 204, an example outer lip 302, and an example downwardly facing channel 304. The inner lip 204 of the lower rim 114 defines the lower opening 202 formed in the bottom portion 116 of the cookbox 100. The downwardly facing channel 304 of the lower rim 114 extends between an example free end 402 of the inner lip 204 of the lower rim 114 and an example free end 404 of the outer lip 302 of the lower rim 114. In the illustrated example of FIGS. 1-9, the downwardly facing channel 304 forms and/or defines and example gap 406 that separates and/or spaces the free end 404 of the outer lip 302 of the lower rim 114 apart from the free end 402 of the inner lip 204 of the lower rim 114.

The inner lip 204 of the lower rim 114 of FIGS. 1-9 is configured to direct internal moisture received at the inner lip 204 from the interior surface 104 of the cookbox 100 toward, into, and/or through the lower opening 202 of the cookbox 100. For example, grease is commonly deposited on the interior surface 104 of the cookbox 100 of FIGS. 1-9 during a cooking process. As the grease flows downward (e.g., due to gravity) along the interior surface 104 of the cookbox 100, the grease is received at the inner lip 204 of the lower rim 114. The inner lip 204 of the lower rim 114 directs the received grease toward, into, and/or through the lower opening 202 of the cookbox 100. Conversely, the outer lip 302 of the lower rim 114 of FIGS. 1-9 is configured to direct external moisture received at the outer lip 302 from the exterior surface 106 of the cookbox 100 away from and/or past (but not into or through) the lower opening 202 of the cookbox 100. For example, rainwater is commonly deposited on the exterior surface 106 of the cookbox 100 of FIGS. 1-9 during a rainstorm. As the rainwater flows downward (e.g., due to gravity) along the exterior surface 106 of the cookbox 100, the rainwater is received at the outer lip 302 of the lower rim 114. The outer lip 302 of the lower rim 114 directs the received rainwater away from and/or past (but not into or through) the lower opening 202 of the cookbox 100.

In the illustrated example of FIGS. 1-9, the free end 404 of the outer lip 302 of the lower rim 114 extends downwardly to, below, or toward a maximum downward extension of the free end 402 of the inner lip 204 of the lower rim 114. For example, as shown in FIGS. 4-9, the free end 402 of the inner lip 204 and the free end 404 of the outer lip 302 extend downwardly to and terminate at an example common horizontal plane 408. In other examples, the free end 404 of the outer lip 302 of the lower rim 114 can extend below the maximum downward extension of the free end 402 of the inner lip 204 of the lower rim 114, such that the free end 402 of the inner lip 204 and the free end 404 of the outer lip 302 do not terminate at the common horizontal plane 408 shown in FIGS. 4-9. In still other examples, the free end 404 of the outer lip 302 of the lower rim 114 can extend downwardly toward, but not completely to, the maximum downward extension of the free end 402 of the inner lip 204 of the lower rim 114, such that the free end 402 of the inner lip 204 of the lower rim 114 extends below the maximum downward extension of the free end 404 of the outer lip 302 of the lower rim 114.

The lower rim 114 of the cookbox 100 of FIGS. 1-9 is configured such that the free end 404 of the outer lip 302 of the lower rim 114 circumscribes the free end 402 of the inner lip 204 of the lower rim 114. For example, as shown in FIGS. 1-9, the free end 402 of the inner lip 204 of the lower rim 114 forms a first continuous perimeter that is surrounded by a second continuous perimeter formed by the free end 404 of the outer lip 302 of the lower rim 114. In the illustrated example of FIGS. 1-9, the free end 402 of the inner lip 204 of the lower rim 114 and the free end 404 of the outer lip 302 of the lower rim 114 respectively have a generally rectangular shape. In other examples, the free end 402 of the inner lip 204 of the lower rim 114 and the free end 404 of the outer lip 302 of the lower rim 114 can respectively have a non-rectangular shape, such as a circular shape. In still other examples, the respective shapes of the free end 402 of the inner lip 204 of the lower rim 114 and the free end 404 of the outer lip 302 of the lower rim 114 can differ from one another. For example, the free end 402 of the inner lip 204 of the lower rim 114 can have a generally rectangular shape, and the free end 404 of the outer lip 302 of the lower rim 114 can have a generally circular shape. As another example, the free end 402 of the inner lip 204 of the lower rim 114 can have a generally circular shape, and the free end 404 of the outer lip 302 of the lower rim 114 can have a generally rectangular shape.

In the illustrated example of FIGS. 1-9, the lower rim 114 of the cookbox 100 is integrally formed with the sidewall 102 of the cookbox 100 such that the interior surface 104 of the sidewall 102 integrally forms and/or defines a portion of the inner lip 204 of the lower rim 114, and such that the exterior surface 106 of the sidewall 102 integrally forms and/or defines a portion of the outer lip 302 of the lower rim 114. The lower rim 114 of the cookbox 100 can be integrally formed with the sidewall 102 of the cookbox 100 via a casting process. For example, the cookbox 100 of FIGS. 1-9 is a cast aluminum cookbox. More specifically, the cookbox 100 of FIGS. 1-9 is made from aluminum and formed via a casting process. Fabrication of the cookbox 100 via the casting process advantageously results in the entire cookbox 100 (e.g., including the sidewall 102 and the lower rim 114) being formed as an integral, single-piece structure that is free of joints, seams, and welds. In other examples, the cookbox 100 can be formed via a casting process, but made from a metal other than aluminum. In still other examples, the cookbox 100 can be formed from a manufacturing process other than casting, and can be made either from aluminum or from a metal other than aluminum.

Figure 10:
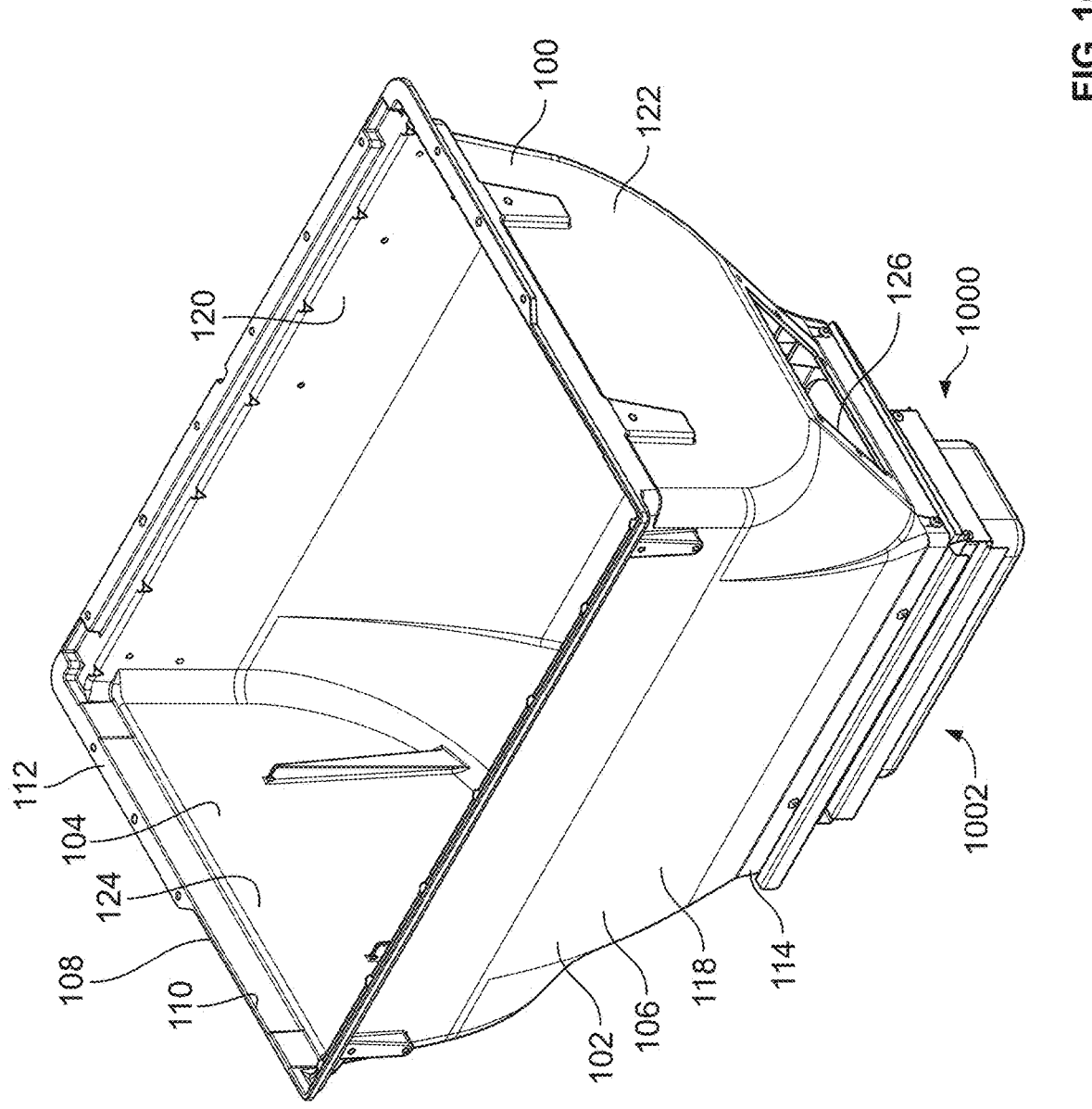
FIG. 10 is a perspective view showing an example waste collection assembly coupled to the cookbox of FIGS. 1-9, with the waste collection assembly shown in an example closed position relative to the cookbox.
Figure 11:
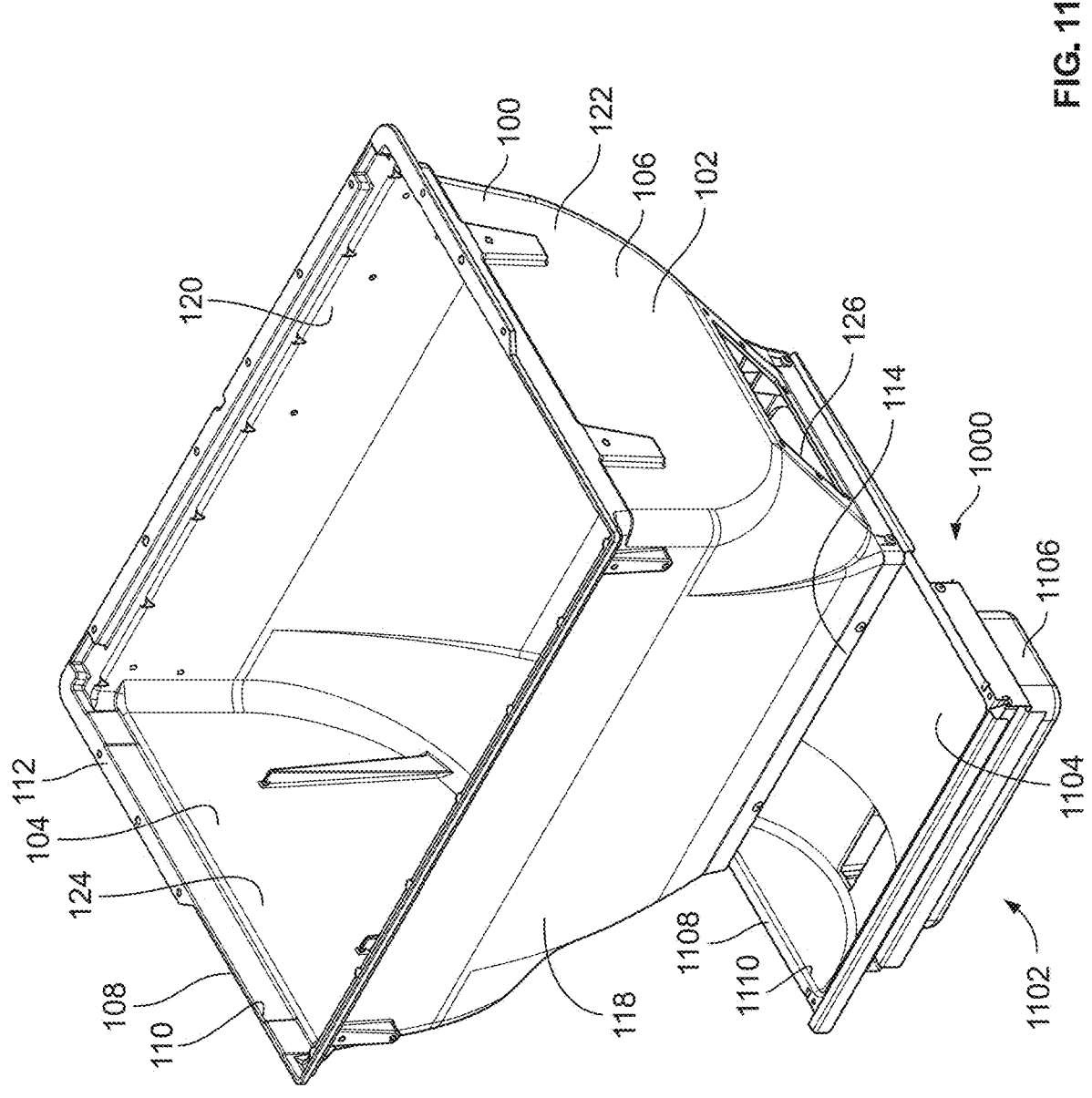
FIG. 11 is a perspective view showing the cookbox and the waste collection assembly of FIG. 10, with the waste collection assembly shown in an example open position relative to the cookbox.

FIG. 10 is a perspective view showing an example waste collection assembly 1000 coupled to the cookbox 100 of FIGS. 1-9, with the waste collection assembly shown in an example closed position 1002 relative to the cookbox 100. FIG. 11 is a perspective view showing the cookbox 100 and the waste collection assembly 1000 of FIG. 10, with the waste collection assembly 1000 shown in an example open position 1102 relative to the cookbox 100.

Figure 12:
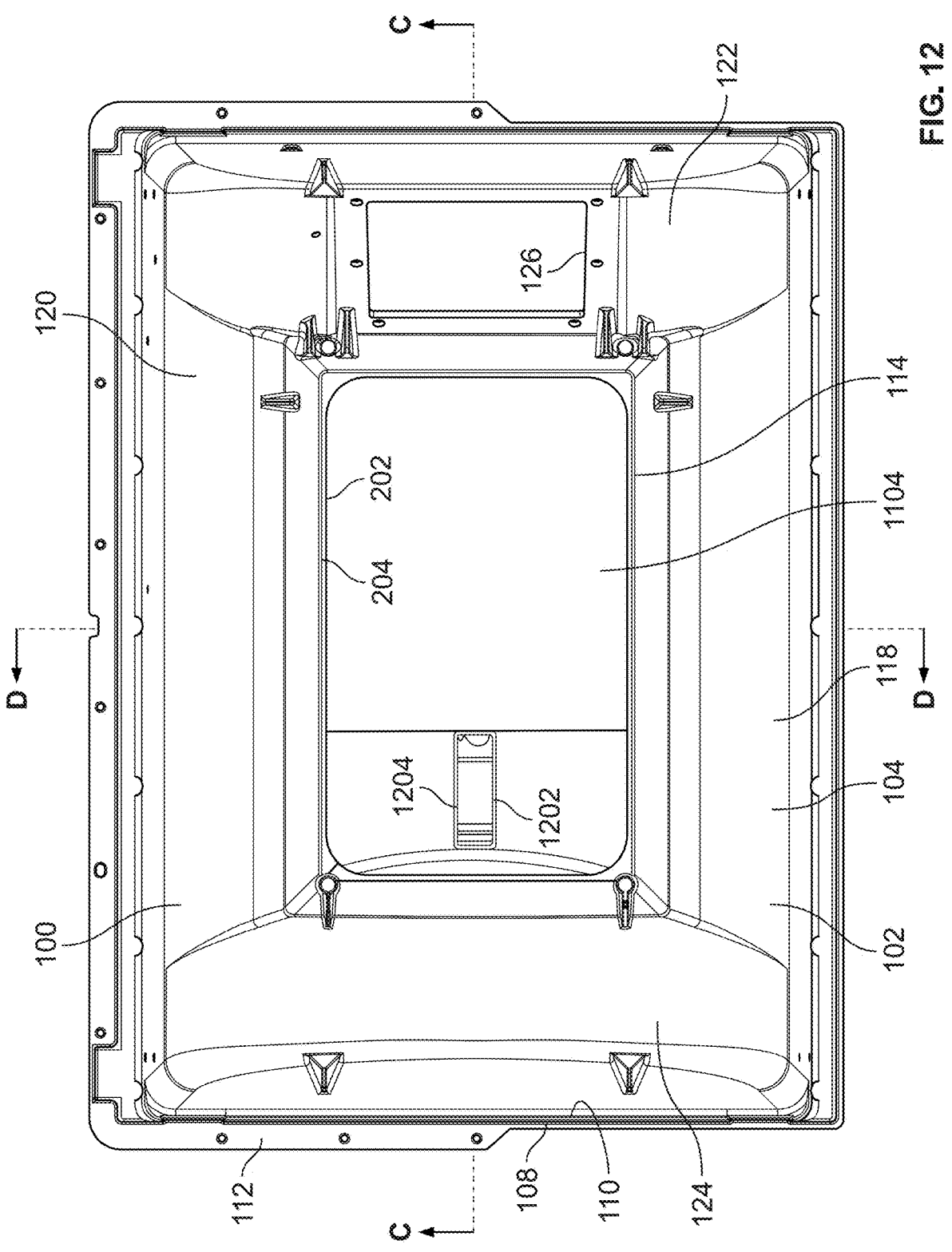
FIG. 12 is a top view of the cookbox and the waste collection assembly of FIGS. 10 and 11.
Figure 13:
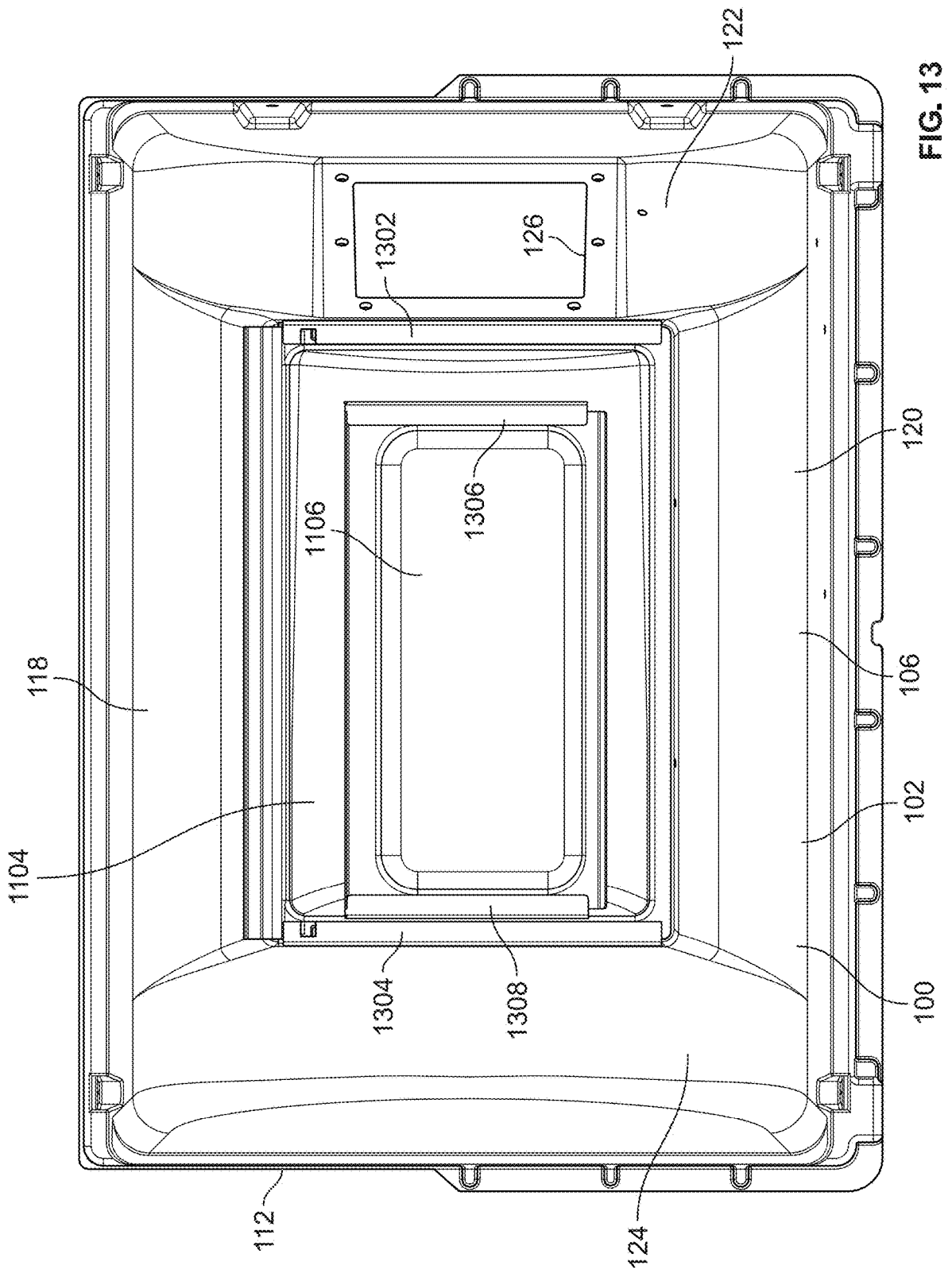
FIG. 13 is a bottom view of the cookbox and the waste collection assembly of FIGS. 10-12.
Figure 14:
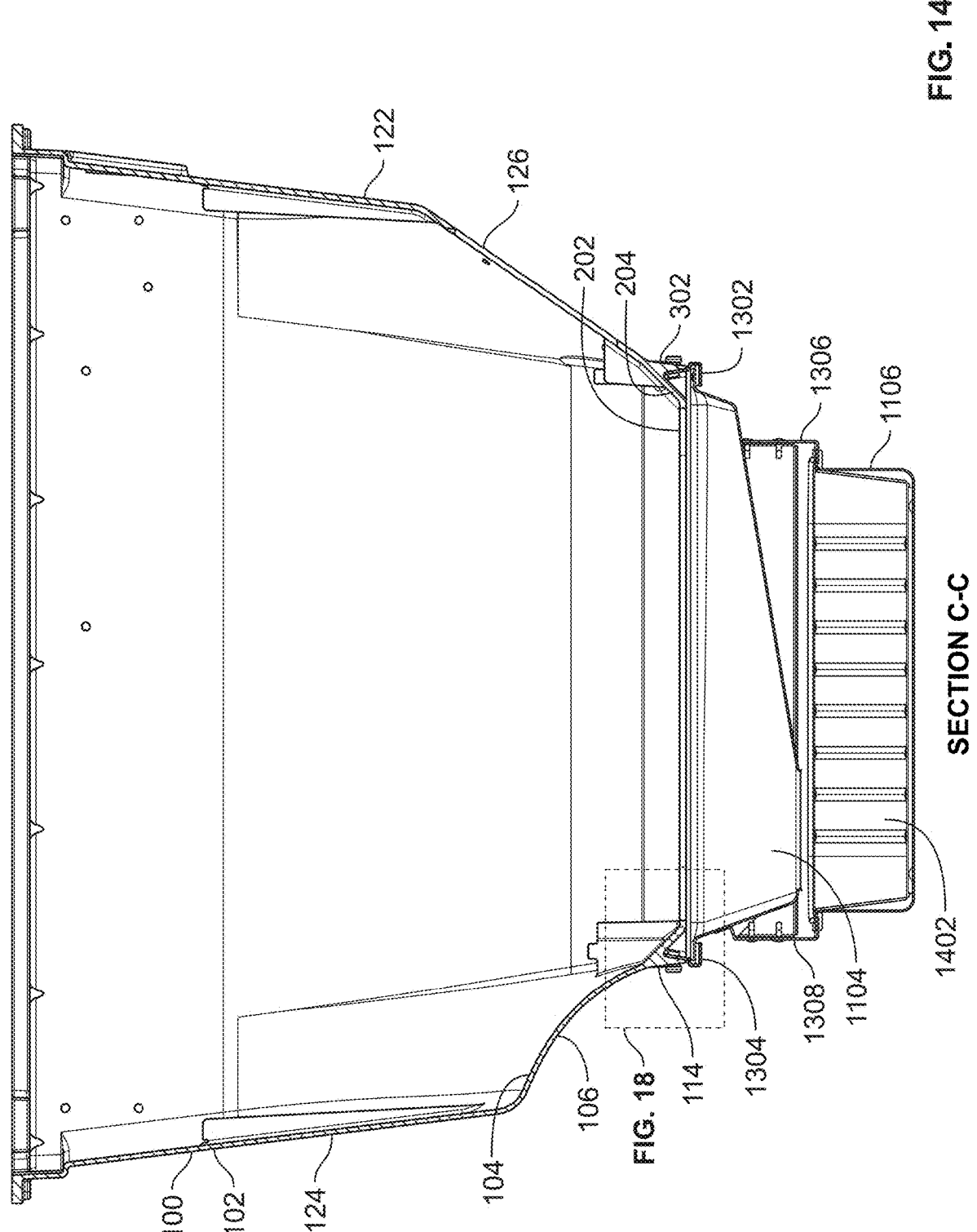
FIG. 14 is a cross-sectional view of the cookbox and the waste collection assembly of FIGS. 10-13 taken along section C-C of FIG. 12.
Figure 15:
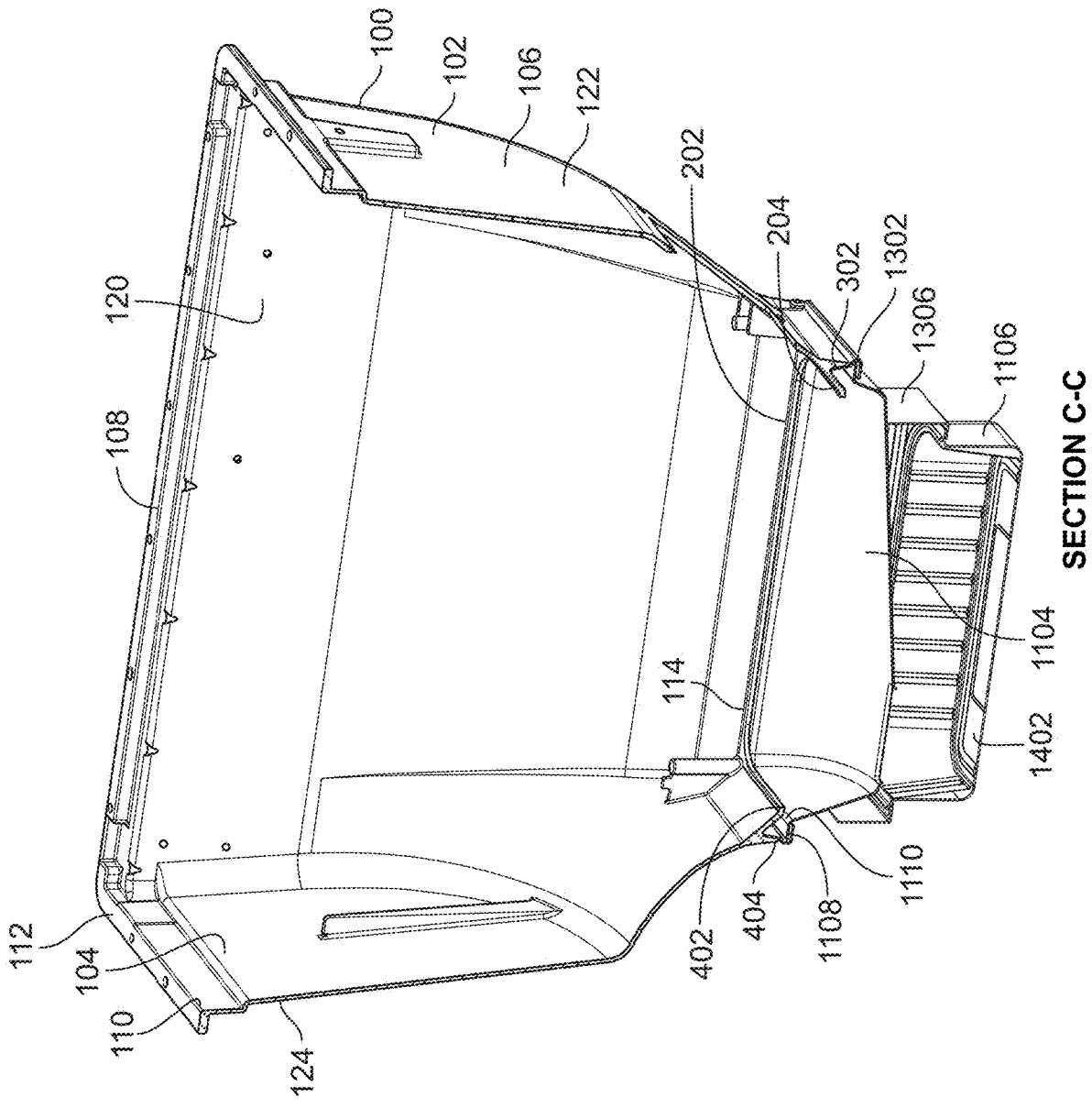
FIG. 15 is a perspective view of the cross-sectional view of FIG. 14.
Figure 16:
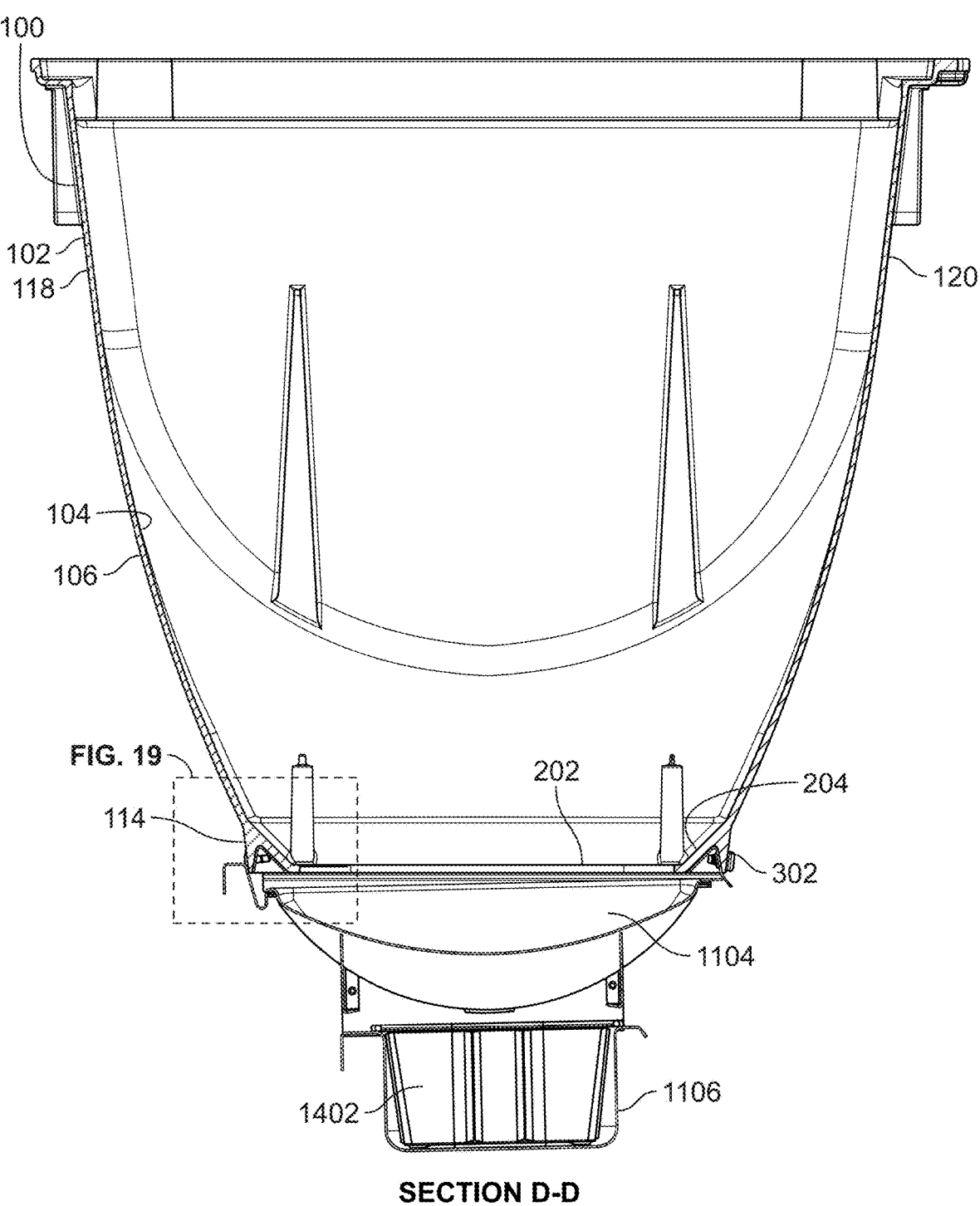
FIG. 16 is a cross-sectional view of the cookbox and the waste collection assembly of FIGS. 10-15 taken along section D-D of FIG. 12.
Figure 17:
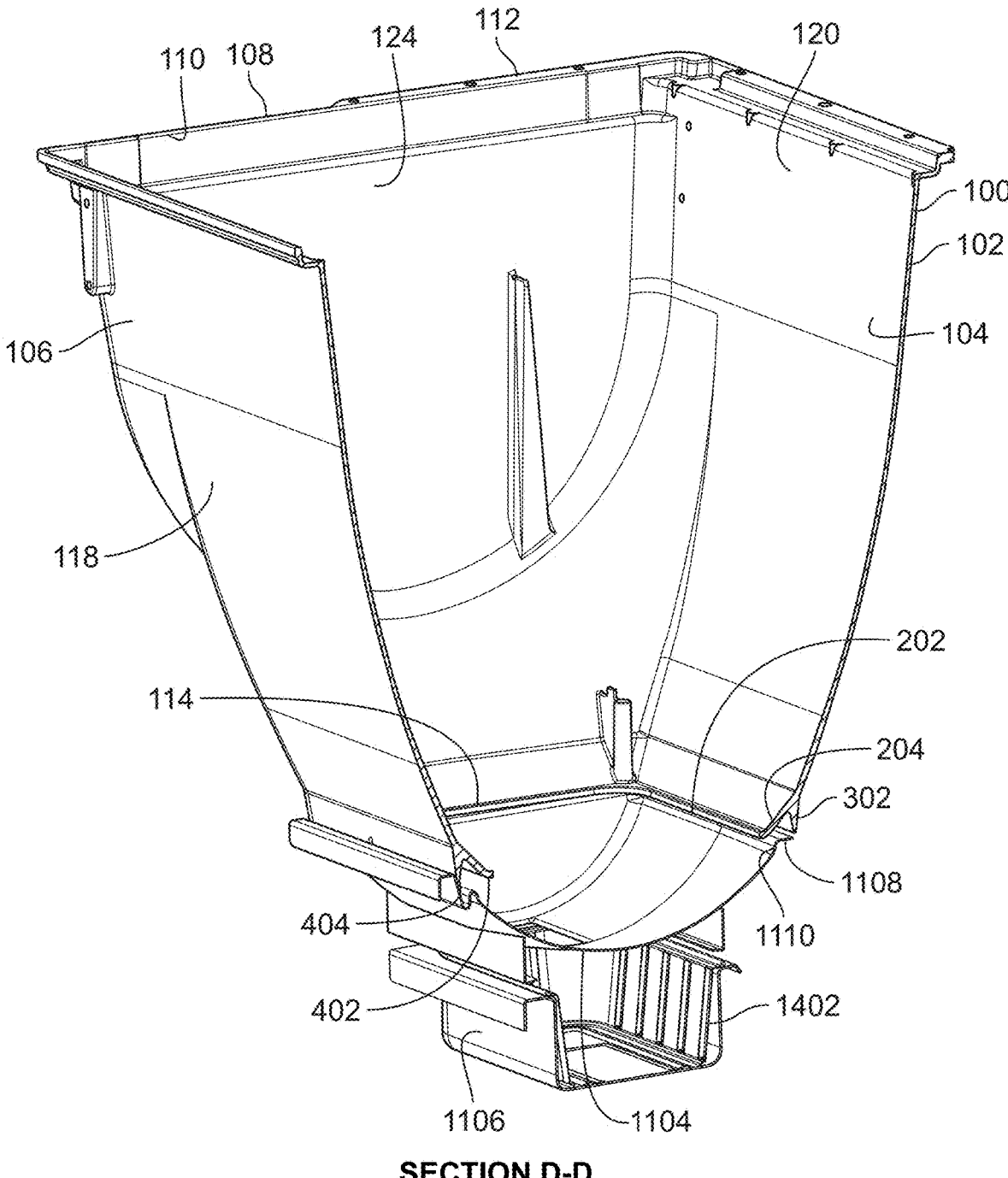
FIG. 17 is a perspective view of the cross-sectional view of FIG. 16.
Figure 18:
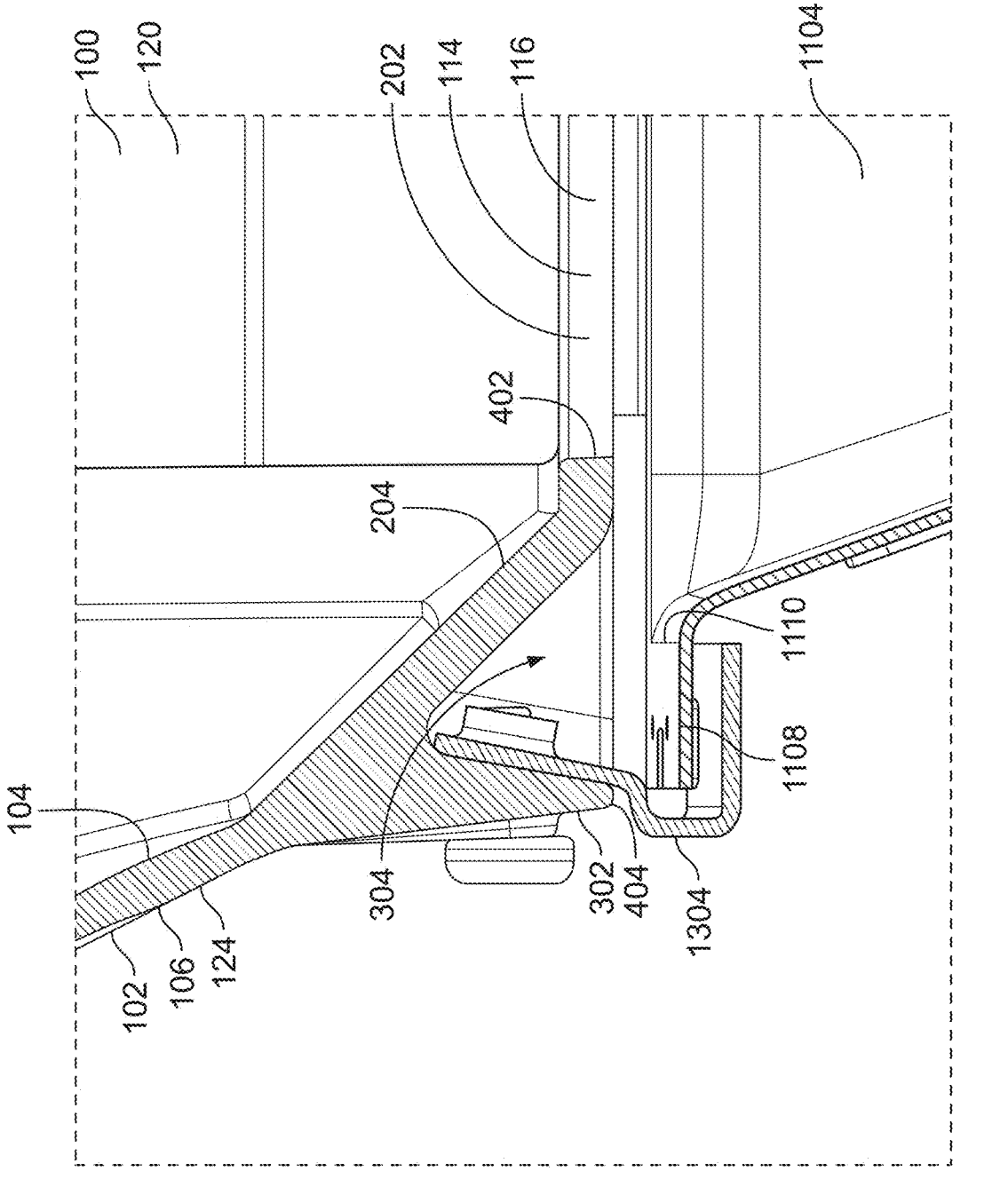
FIG. 18 is an enlarged view of a portion of FIG. 14.
Figure 19:
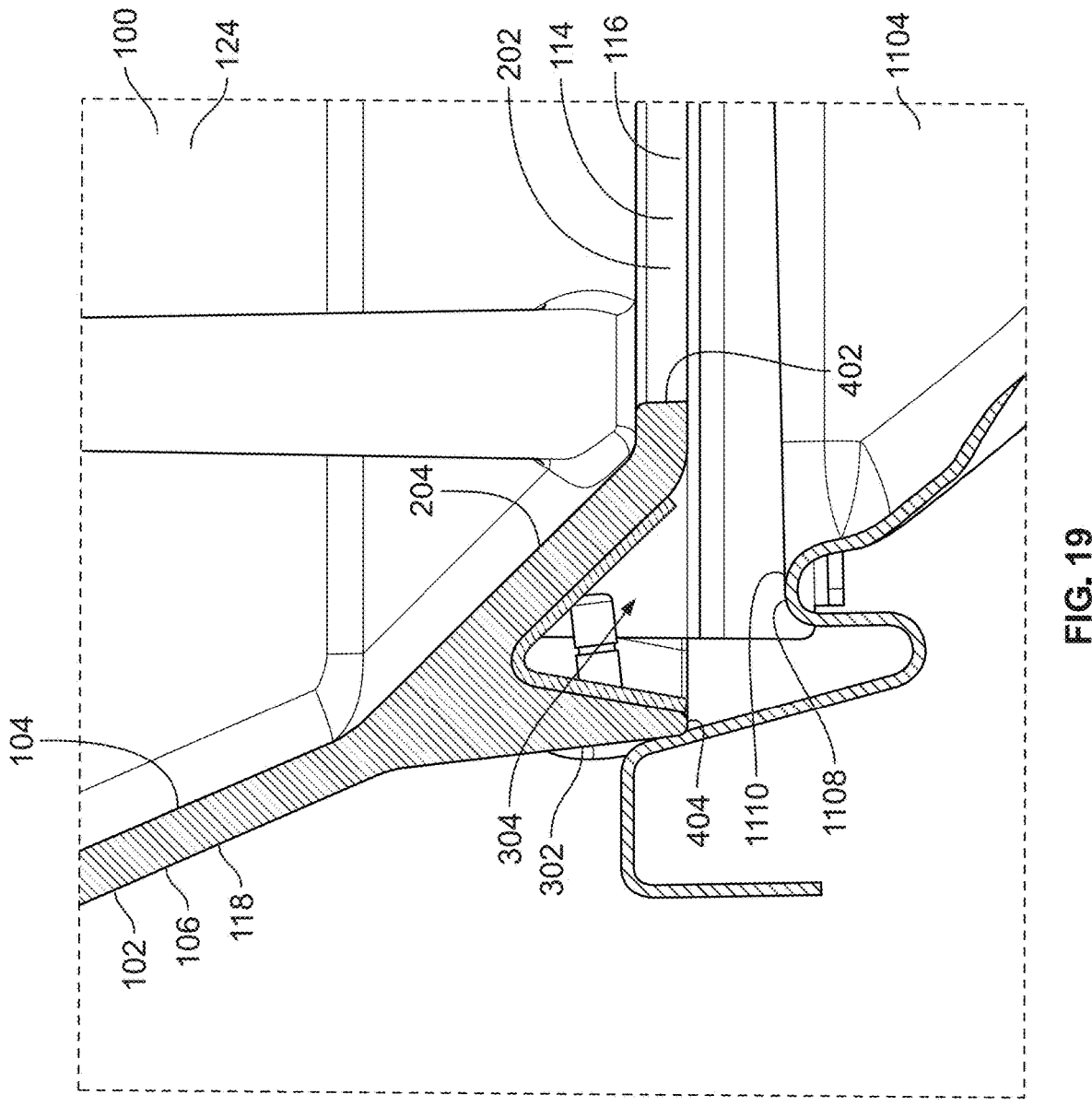
FIG. 19 is an enlarged view of a portion of FIG. 16.

FIG. 12 is a top view of the cookbox 100 and the waste collection assembly 1000 of FIGS. 10 and 11. FIG. 13 is a bottom view of the cookbox 100 and the waste collection assembly 1000 of FIGS. 10-12. FIG. 14 is a cross-sectional view of the cookbox 100 and the waste collection assembly 1000 of FIGS. 10-13 taken along section C-C of FIG. 12. FIG. 15 is a perspective view of the cross-sectional view of FIG. 14. FIG. 16 is a cross-sectional view of the cookbox 100 and the waste collection assembly 1000 of FIGS. 10-15 taken along section D-D of FIG. 12. FIG. 17 is a perspective view of the cross-sectional view of FIG. 16. FIG. 18 is an enlarged view of a portion of FIG. 14. FIG. 19 is an enlarged view of a portion of FIG. 16.

The waste collection assembly 1000 of FIGS. 10-19 is configured to collect and facilitate the removal of cooking waste from the cookbox 100. In the illustrated example of FIGS. 10-19, the waste collection assembly 1000 includes an example waste tray 1104, an example waste bin 1106, an example disposable liner 1402, an example first support rail 1302, an example second support rail 1304, an example third support rail 1306, and an example fourth support rail 1308. The waste bin 1106 is configured to hold and/or contain the disposable liner 1402, with the disposable liner 1402 being removable from the waste bin 1106. The waste tray 1104, the waste bin 1106, and the disposable liner 1402 of the waste collection assembly 1000 of FIGS. 10-19 are collectively configured such that the waste tray 1104 receives cooking waste from the cookbox 100, and such that the waste bin 1106 and/or the disposable liner 1402 receive(s) cooking waste from the waste tray 1104. Cooking waste generated in the cookbox 100 can accordingly travel from the cookbox 100 into and/or onto the waste tray 1104, and from the waste tray 1104 into and/or onto the waste bin 1106 and/or the disposable liner 1402.

The first support rail 1302 and the second support rail 1304 of the waste collection assembly 1000 of FIGS. 10-19 are spaced apart from one another and are respectively coupled to the lower rim 114 of the cookbox 100. In the illustrated example of FIGS. 10-19, the first support rail 1302 and the second support rail 1304 are respectively coupled to the outer lip 302 of the lower rim 114. In other examples, the first support rail 1302 and the second support rail 1304 can respectively be coupled to the inner lip 204 of the lower rim 114. In still other examples, the first support rail 1302 can be coupled to the outer lip 302 of the lower rim 114, and the second support rail 1304 can be coupled to the inner lip 204 of the lower rim 114. In still other examples, the first support rail 1302 can be coupled to the inner lip 204 of the lower rim 114, and the second support rail 1304 can be coupled to the outer lip 302 of the lower rim 114. In the illustrated example of FIGS. 10-19, the first support rail 1302 and the second support rail 1304 of the waste collection assembly 1000 respectively extend downwardly below and/or past the lower rim 114 of the cookbox 100. More specifically, the first support rail 1302 and the second support rail 1304 respectively extend downwardly below and/or past the free end 402 of the inner lip 204 of the lower rim 114 and the free end 404 of the outer lip 302 of the lower rim 114. In other examples, the free end 402 of the inner lip 204 of the lower rim 114 and/or the free end 404 of the outer lip 302 of the lower rim 114 can extend downwardly below and/or past the first support rail 1302 and/or the second support rail 1304.

The waste tray 1104 of the waste collection assembly 1000 of FIGS. 10-19 is suspended from and slidably coupled to the first support rail 1302 and the second support rail 1304 of the waste collection assembly 1000. The waste tray 1104 is moveable (e.g., slidable) along the first support rail 1302 and the second support rail 1304 between the closed position 1002 shown in FIG. 10 in which a substantial portion of the waste tray 1104 is covered by the underside of the cookbox 100, and the open position 1102 shown in FIG. 11 in which a substantial portion of the waste tray 1104 is located forward of and not covered by the underside of the cookbox 100. In the illustrated example of FIGS. 10-19, the first support rail 1302 of the waste collection assembly 1000 is coupled to the lower rim 114 of the cookbox 100 along the right side portion 122 of the cookbox 100, and the second support rail 1304 of the waste collection assembly 1000 is coupled to the lower rim 114 of the cookbox 100 along the left side portion 124 of the cookbox 100, thereby facilitating the waste tray 1104 being slidable relative to the cookbox 100 in a front-to-rear direction. In other examples, the first support rail 1302 of the waste collection assembly 1000 can be coupled to the lower rim 114 of the cookbox 100 along the front portion 118 of the cookbox 100, and the second support rail 1304 of the waste collection assembly 1000 can be coupled to the lower rim 114 of the cookbox 100 along the rear portion 120 of the cookbox 100, thereby facilitating the waste tray 1104 being slidable relative to the cookbox 100 in a side-to-side direction.

The third support rail 1306 and the fourth support rail 1308 of the waste collection assembly 1000 of FIGS. 10-19 are spaced apart from one another and are respectively coupled to the underside of the waste tray 1104 of the waste collection assembly 1000. The waste bin 1106 of the waste collection assembly 1000 of FIGS. 10-19 is suspended from and removably coupled to the third support rail 1306 and the fourth support rail 1308 of the waste collection assembly 1000. The waste bin 1106 moves with the waste tray 1104 as the waste tray 1104 moves (e.g., slides) along the first support rail 1302 and the second support rail 1304 between the closed position 1002 shown in FIG. 10 and the open position 1102 shown in FIG. 11. Independently of its movement with the waste tray 1104, the waste bin 1106 is also movable (e.g., slidable) relative to the waste tray 1104 along the third support rail 1306 and the fourth support rail 1308. In the illustrated example of FIGS. 10-19, the third support rail 1306 is coupled to a right side portion of the waste tray 1104 and the fourth support rail 1308 is coupled to a left side portion of the waste tray 1104, thereby facilitating the waste bin 1106 being slidable relative to the waste tray 1104 in a front-to-rear direction. In other examples, the third support rail 1306 can be coupled to a front portion of the waste tray 1104, and the fourth support rail 1308 can be coupled to a rear portion of the waste tray 1104, thereby facilitating the waste bin 1106 being slidable relative to the waste tray 1104 in a side-to-side direction.

The waste tray 1104 of the waste collection assembly 1000 of FIGS. 10-19 includes an example upper rim 1108 that defines an example upper opening 1110 of the waste tray 1104, and an example lower rim 1202 that defines and example lower opening 1204 of the waste tray 1104. The waste tray 1104 receives cooking waste from the cookbox 100 via the upper opening 1110 of the waste tray 1104, and transfers the received cooking waste from the waste tray 1104 into the waste bin 1106 and/or the disposable liner 1402 via the lower opening 1204 of the waste tray 1104. In the illustrated example of FIGS. 10-19, the upper rim 1108 and/or the upper opening 1110 of the waste tray 1104, the free end 402 of the inner lip 204 of the lower rim 114 of the cookbox 100, and the free end 404 of the outer lip 302 of the lower rim 114 of the cookbox 100 are collectively config-
ured such that, when the waste tray 1104 is in the closed
position 1002 relative to the cookbox 100, the free end 404
of the outer lip 302 circumscribes the upper rim 1108 and/or
the upper opening 1110 of the waste tray 1104, and the free
end 402 of the inner lip 204 is circumscribed by the upper
rim 1108 and/or the upper opening 1110 of the waste tray
1104.

In the illustrated example of FIGS. 10-19, the free end 402
of the inner lip 204 of the lower rim 114 defines and/or
constitutes an internal drip point for internal moisture (e.g.,
grease) received at the inner lip 204 of the lower rim 114
from the interior surface 104 of the sidewall 102 of the
cookbox 100. Conversely, the free end 404 of the outer lip
302 of the lower rim 114 defines and/or constitutes an
external drip point for external moisture (e.g., rainwater)
received at the outer lip 302 of the lower rim 114 from the
exterior surface 106 of the sidewall 102 of the cookbox 100.
When the waste tray 1104 and/or, more generally, the waste
collection assembly 1000 of FIGS. 10-19 is in the closed
position 1002 relative to the cookbox 100, the internal drip
point defined by the free end 402 of the inner lip 204 of the
lower rim 114 is located within a perimeter defined by the
upper opening 1110 of the waste tray 1104, and the external
drip point defined by the free end 404 of the outer lip 302 of
the lower rim 114 is located outside of the perimeter defined
by the upper opening 1110 of the waste tray 1104. The
internal drip point defined by the free end 402 of the inner
lip 204 of the lower rim 114 directs internal moisture (e.g.,
grease) received at the inner lip 204 from the interior surface
104 of the cookbox 100 toward and/or into the waste tray
1104, while the external drip point defined by the free end
404 of the outer lip 302 of the lower rim 114 directs external
moisture (e.g., rainwater) received at the outer lip 302 from
the exterior surface 106 of the cookbox 100 away from
and/or past (but not toward or into) the waste tray 1104. The
aforementioned arrangement advantageously reduces, lim-
its, and/or prevents external moisture (e.g., rainwater) trav-
eling along the exterior surface 106 of the cookbox 100 from
entering the waste tray 1104 of the waste collection assem-
bly 1000, while still enabling internal moisture (e.g., grease)
traveling along the interior surface 104 of the cookbox 100
to enter the waste tray 1104 of the waste collection assembly
1000.

Figure 20:
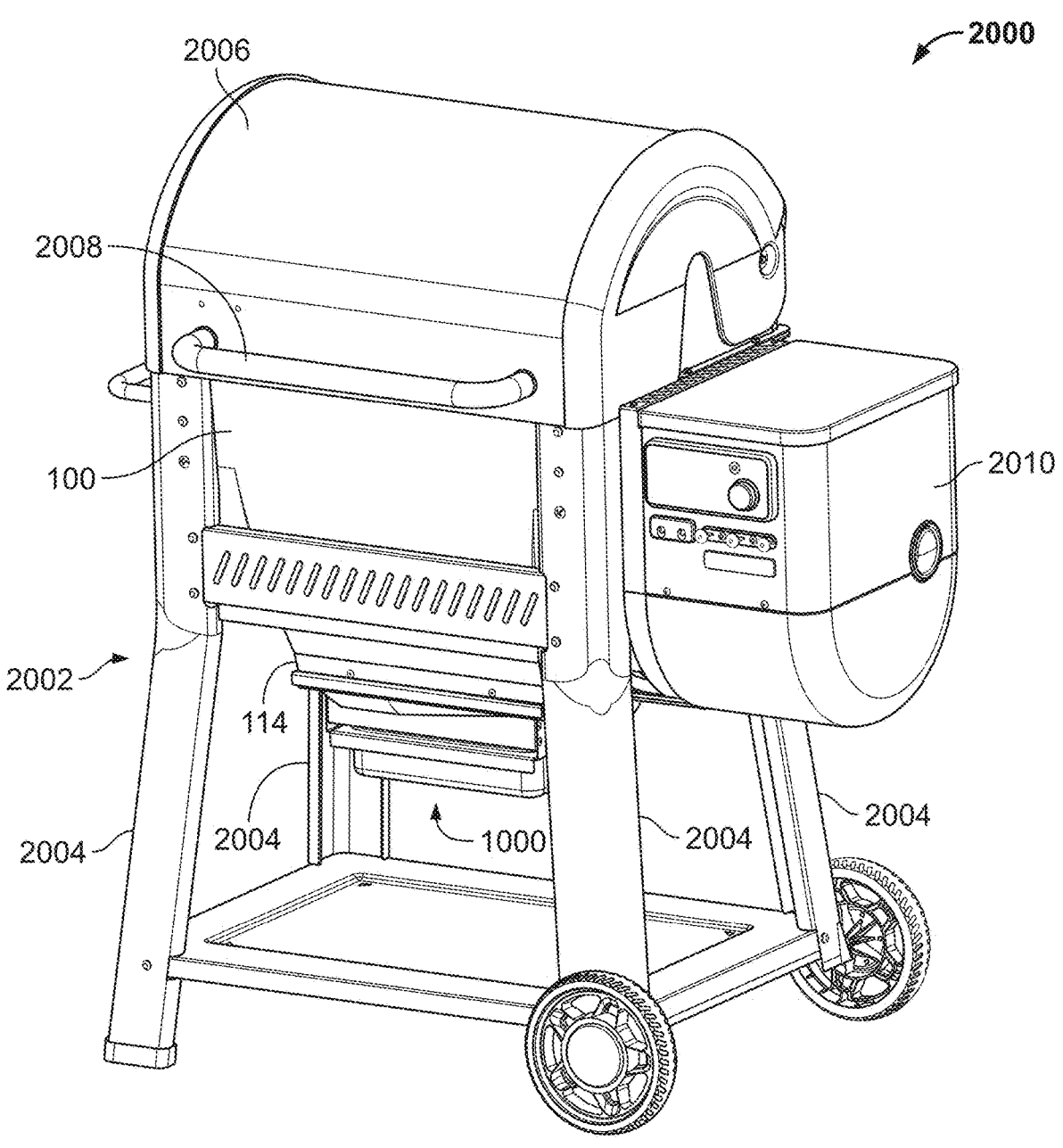
FIG. 20 is a perspective view of an example grill including the cookbox of FIGS. 1-19 and the waste collection assembly of FIGS. 10-19.
Figure 21:
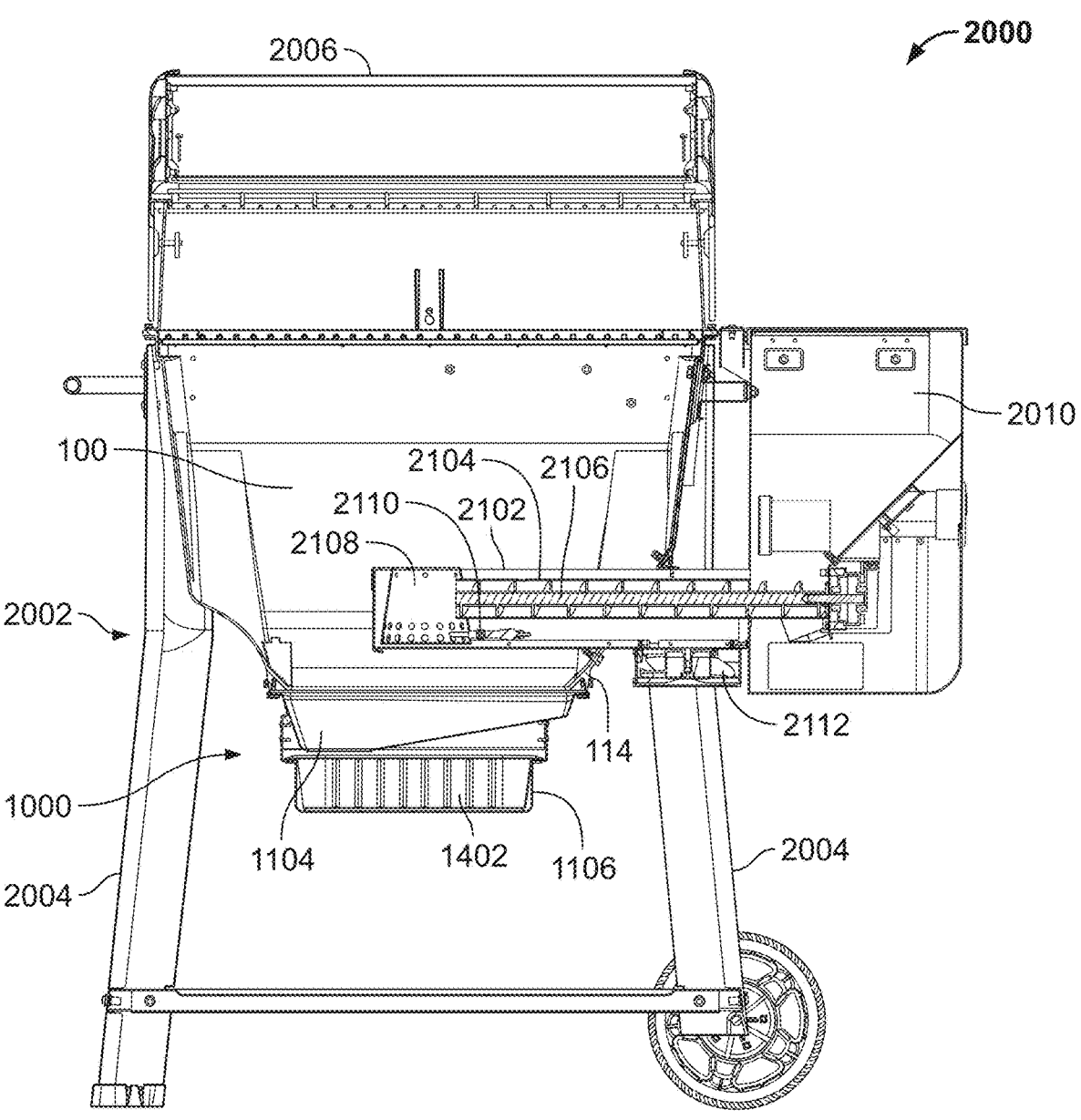
FIG. 21 is a partial cutaway view of the grill of FIG. 20.

FIG. 20 is a perspective view of an example grill 2000
including the cookbox 100 of FIGS. 1-19 and the waste
collection assembly 1000 of FIGS. 10-19. FIG. 21 is a
partial cutaway view of the grill 2000 of FIG. 20. The grill
2000 of FIGS. 20 and 21 includes an example frame 2002.
In the illustrated example of FIGS. 20 and 21, the frame
2002 includes one or more example support member(s) 2004
(e.g., one or more vertically oriented leg(s)) that are con-
figured to support the cookbox 100 and/or the waste collec-
tion assembly 1000 above an underlying ground surface.
The support member(s) 2004 and/or, more generally, the
frame 2002 can be configured from any number and any type
of structural components arranged in any manner that facili-
tates supporting the cookbox 100 and/or the waste collection
assembly 1000 above an underlying ground surface when
the grill 2000 is in use. For example, while each of the one
or more support member(s) 2004 shown in FIGS. 20 and 21
is fixed relative to the cookbox 100, in other examples the
frame 2002 can include one or more foldable, slidable,
and/or telescoping support member(s) 2004 that facilitate
collapsing and/or otherwise modifying the frame 2002 of the
grill 2000 when the grill 2000 is not in use. The grill 2000 of FIGS. 20 and 21 can further include one or more side
table(s) coupled to the frame 2002 and/or to the cookbox 100
of the grill 2000.

The grill 2000 of FIGS. 20 and 21 further includes an
example lid 2006 configured to cover and/or enclose the
cookbox 100 of the grill 2000 when the lid 2006 is in a
closed position. The lid 2006 is movable relative to the
cookbox 100 between a closed position and an open position
in which a cooking surface (e.g., a cooking grate) located on
or within the cookbox 100 is exposed. In the illustrated
example of FIGS. 20 and 21, the lid 2006 is pivotally
coupled to the cookbox 100 via one or more hinge(s) and/or
pivot(s) that mechanically couple the lid 2006 to the cook-
box 100. Movement of the lid 2006 of the grill 2000 between
the closed position and the open position can be facilitated
via user interaction with an example handle 2008 that is
coupled to the lid 2006.

In the illustrated example of FIGS. 20 and 21, the grill
2000 is configured as a pellet grill. In this regard, the grill
2000 of FIGS. 20 and 21 includes an example hopper 2010
coupled to the cookbox 100 and/or to the frame 2002, with
the hopper 2010 being configured to hold and/or contain a
supply of combustible wood pellets. The grill 2000 of FIGS.
20 and 21 further includes an example ducted housing 2102,
an example auger duct 2104, an example auger 2106, an
example burn pot 2108, an example ignitor 2110, and an
example fan 2112. The ducted housing 2102, the auger duct
2104, and the auger 2106 respectively extend from the
hopper 2010 of the grill 2000, through the side opening 126
formed in the sidewall 102 of the cookbox 100, and into a
cooking chamber of the cookbox 100 defined by the interior
surface 104 of the cookbox 100. The auger 2106 is located
within the auger duct 2104, and the auger duct 2104 is
located within the ducted housing 2102.

The burn pot 2108 of the grill is located within the ducted
housing 2102. In the illustrated example of FIGS. 20 and 21,
the auger 2106 and the auger duct 2104 respectively extend
to and/or or into the burn pot 2108 such that that auger 2106
and the auger duct 2104 collectively transport wood pellets
from the hopper 2010 into the burn pot 2108. Combustion of
the wood pellets received in the burn pot 2108 can be
initiated via activation of the ignitor 2110 which, like the
burn pot 2108, is also located within the ducted housing
2102. In this regard, a heat-generating portion (e.g., an
ignition tip) of the ignitor 2110 extends into the burn pot
2108 such that the heat-generating portion of the ignitor
2110 contacts at least some of the wood pellets received in
the burn pot 2108. Once combustion of the wood pellets
received in the burn pot 2108 has commenced via the
ignition process, the rate of such combustion can be man-
aged via a controlled airflow generated by the fan 2112, with
said airflow being delivered from the fan 2112 into the
ducted housing 2102, and through the ducted housing 2102
to the burn pot 2108. In the illustrated example of FIGS. 20
and 21, the burn pot 2108 is located within the cookbox 100
and is positioned centrally relative to the lower rim 114 of
the cookbox 100. More specifically, the burn pot 2108 is
positioned centrally relative to the lower opening 202
defined by the inner lip 204 of the lower rim 114 of the
cookbox 100. In other examples, one or more portion(s) of
the burn pot 2108 located within the cookbox 100 can be
positioned partially or entirely outside of the lower opening
202 defined by the inner lip 204 of the lower rim 114 of the
cookbox 100.

The following paragraphs provide various examples in
relation to the disclosed grill cookboxes including dual-
lipped lower rims.

Example 1 includes a cookbox. In Example 1, the cookbox includes an interior surface, an exterior surface, and a lower rim. The exterior surface is located opposite the interior surface. The lower rim is located along a bottom portion of the cookbox. In Example 1, the lower rim includes an inner lip, an outer lip, and a downwardly facing channel. The inner lip defines an opening formed in the bottom portion of the cookbox. The downwardly facing channel extends between a free end of the inner lip and a free end of the outer lip.

Example 2 includes the cookbox of Example 1. In Example 2, the inner lip is configured to direct internal moisture received at the inner lip from the interior surface into the opening, and the outer lip is configured to direct external moisture received at the outer lip from the exterior surface away from the opening.

Example 3 includes the cookbox of Example 1. In Example 3, the free end of the outer lip extends downwardly below a maximum downward extension of the free end of the inner lip, or the free end of the inner lip extends downwardly below a maximum downward extension of the free end of the outer lip.

Example 4 includes the cookbox of Example 1. In Example 4, the free end of the inner lip and the free end of the outer lip extend downwardly to and terminate at a common horizontal plane.

Example 5 includes the cookbox of Example 1. In Example 5, the free end of the outer lip circumscribes the free end of the inner lip.

Example 6 includes the cookbox of Example 5. In Example 6, the free end of the inner lip and the free end of the outer lip respectively have a generally rectangular shape.

Example 7 includes the cookbox of Example 1. In Example 7, the interior surface forms a portion of the inner lip, and the exterior surface forms a portion of the outer lip.

Example 8 includes the cookbox of Example 1. In Example 8, the lower rim is integrally formed with the interior surface and the exterior surface.

Example 9 includes the cookbox of Example 1. In Example 9, the cookbox is a cast aluminum cookbox.

Example 10 includes a grill. In Example 10, the grill includes a cookbox and a waste collection assembly. In Example 10, the cookbox includes an interior surface, an exterior surface, and a lower rim. The exterior surface is located opposite the interior surface. The lower rim is located along a bottom portion of the cookbox. In Example 10, the lower rim includes an inner lip, an outer lip, and a downwardly facing channel. The inner lip defines an opening formed in the bottom portion of the cookbox. The downwardly facing channel extends between a free end of the inner lip and a free end of the outer lip. In Example 10, the waste collection assembly is coupled to the cookbox. In Example 10, the waste collection assembly includes a waste tray configured to receive cooking waste from the cookbox via the opening. The waste tray is movable relative to the cookbox between a closed position and an open position.

Example 11 includes the grill of Example 10. In Example 11, the inner lip is configured to direct internal moisture received at the inner lip from the interior surface through opening and into the waste tray when the waste tray is in the closed position, and the outer lip is configured to direct external moisture received at the outer lip from the exterior surface away from the opening and away from the waste tray when the waste tray is in the closed position.

Example 12 includes the grill of Example 10. In Example 12, the free end of the outer lip extends downwardly below a maximum downward extension of the free end of the inner lip, or the free end of the inner lip extends downwardly below a maximum downward extension of the free end of the outer lip.

Example 13 includes the grill of Example 10. In Example 13, the free end of the inner lip and the free end of the outer lip extend downwardly to and terminate at a common horizontal plane.

Example 14 includes the grill of Example 10. In Example 14, an upper rim of the waste tray circumscribes the free end of the inner lip when the waste tray is in the closed position, and the free end of the outer lip circumscribes the upper rim of the waste tray when the waste tray is in the closed position.

Example 15 includes the grill of Example 14. In Example 15, the free end of the inner lip and the free end of the outer lip respectively have a generally rectangular shape.

Example 16 includes the grill of Example 10. In Example 16, the interior surface forms a portion of the inner lip, and the exterior surface forms a portion of the outer lip.

Example 17 includes the grill of Example 10. In Example 17, the lower rim is integrally formed with the interior surface and the exterior surface.

Example 18 includes the grill of Example 10. In Example 18, the cookbox is a cast aluminum cookbox.

Example 19 includes the grill of Example 10. In Example 19, the waste collection assembly includes a first support rail and a second support rail spaced apart from the first support rail. The first support rail and the second support rail are configured to support the waste tray such that the waste tray is slidable along the first support rail and the second support rail between the closed position and the open position. In Example 19, the first support rail and the second support rail are respectively coupled to the outer lip.

Example 20 includes the grill of Example 10. In Example 20, the grill is a pellet grill including a burn pot located within the cookbox. In Example 20, the free end of the inner lip circumscribes the burn pot. An upper rim of the waste tray circumscribes the free end of the inner lip when the waste tray is in the closed position. The free end of the outer lip circumscribes the upper rim of the waste tray when the waste tray is in the closed position.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:
1. A cookbox, comprising:
an interior surface;
an exterior surface located opposite the interior surface; and
a lower rim located along a bottom portion of the cookbox, the lower rim including an inner lip, an outer lip, and a downwardly facing channel, the inner lip defining an opening formed in the bottom portion of the cookbox, the inner lip including a free end that defines and terminates at a horizontal plane, the outer lip circumscribing the inner lip, the outer lip including a free end that extends to and terminates at the horizontal plane such that the free end of the inner lip and the free end of the outer lip terminate at a same height, the down- wardly facing channel extending between the free end of the inner lip and the free end of the outer lip.

2. The cookbox of claim 1, wherein the inner lip is configured to direct internal moisture received at the inner lip from the interior surface into the opening, and wherein the outer lip is configured to direct external moisture received at the outer lip from the exterior surface away from the opening.

3. The cookbox of claim 1, wherein the free end of the inner lip and the free end of the outer lip respectively have a generally rectangular shape.

4. The cookbox of claim 1, wherein the interior surface forms a portion of the inner lip, and the exterior surface forms a portion of the outer lip.

5. The cookbox of claim 1, wherein the lower rim is integrally formed with the interior surface and the exterior surface.

6. The cookbox of claim 1, wherein the cookbox is a cast aluminum cookbox.

7. A grill, comprising:
a cookbox including:
an interior surface;
an exterior surface located opposite the interior surface; and
a lower rim located along a bottom portion of the cookbox, the lower rim including an inner lip, an outer lip, and a downwardly facing channel, the inner lip defining an opening formed in the bottom portion of the cookbox, the downwardly facing channel extending between a free end of the inner lip and a free end of the outer lip; and
a waste collection assembly coupled to the cookbox, the waste collection assembly including:
a waste tray configured to receive cooking waste from the cookbox via the opening, the waste tray being movable relative to the cookbox between a closed position and an open position; and
a first support rail and a second support rail, the second rail spaced apart from the first support rail, wherein the first support rail and the second support rail are configured to support the waste tray such that the waste tray is slidable along the first support rail and the second support rail between the closed position and the open position, wherein the first support rail and the second support rail are respectively coupled to the outer lip.

8. The grill of claim 7, wherein the inner lip is configured to direct internal moisture received at the inner lip from the interior surface through opening and into the waste tray when the waste tray is in the closed position, and wherein the outer lip is configured to direct external moisture received at the outer lip from the exterior surface away from the opening and away from the waste tray when the waste tray is in the closed position.

9. The grill of claim 7, wherein the free end of the outer lip extends downwardly below a maximum downward extension of the free end of the inner lip, or the free end of the inner lip extends downwardly below a maximum downward extension of the free end of the outer lip.

10. The grill of claim 7, wherein the free end of the inner lip and the free end of the outer lip extend downwardly to and terminate at a common horizontal plane.

11. The grill of claim 7, wherein an upper rim of the waste tray circumscribes the free end of the inner lip when the waste tray is in the closed position, and wherein the free end of the outer lip circumscribes the upper rim of the waste tray when the waste tray is in the closed position.

12. The grill of claim 11, wherein the free end of the inner lip and the free end of the outer lip respectively have a generally rectangular shape.

13. The grill of claim 7, wherein the interior surface forms a portion of the inner lip, and the exterior surface forms a portion of the outer lip.

14. The grill of claim 7, wherein the lower rim is integrally formed with the interior surface and the exterior surface.

15. A pellet grill, comprising:
a cookbox including:
an interior surface;
an exterior surface located opposite the interior surface; and
a lower rim located along a bottom portion of the cookbox, the lower rim including an inner lip, an outer lip, and a downwardly facing channel, the inner lip defining an opening formed in the bottom portion of the cookbox, the downwardly facing channel extending between a free end of the inner lip and a free end of the outer lip;
a burn pot located within the cookbox, the free end of the inner lip circumscribing the burn pot; and
a waste collection assembly coupled to the cookbox, the waste collection assembly including a waste tray configured to receive cooking waste from the cookbox via the opening, the waste tray being movable relative to the cookbox between a closed position and an open position, wherein an upper rim of the waste tray circumscribes the free end of the inner lip when the waste tray is in the closed position, and wherein the free end of the outer lip circumscribes the upper rim of the waste tray when the waste tray is in the closed position.

16. The pellet grill of claim 15, wherein the inner lip is configured to direct internal moisture received at the inner lip from the interior surface through opening and into the waste tray when the waste tray is in the closed position, and wherein the outer lip is configured to direct external moisture received at the outer lip from the exterior surface away from the opening and away from the waste tray when the waste tray is in the closed position.

17. The pellet grill of claim 15, wherein the free end of the outer lip extends downwardly below a maximum downward extension of the free end of the inner lip, or the free end of the inner lip extends downwardly below a maximum downward extension of the free end of the outer lip.

18. The pellet grill of claim 15, wherein the free end of the inner lip and the free end of the outer lip extend downwardly to and terminate at a common horizontal plane.

19. The pellet grill of claim 15, wherein the interior surface forms a portion of the inner lip, and the exterior surface forms a portion of the outer lip.

20. The pellet grill of claim 15, wherein the lower rim is integrally formed with the interior surface and the exterior surface.

* * * * *